United States Patent
Bartolomé Rodrigo et al.

(10) Patent No.: US 11,943,614 B2
(45) Date of Patent: Mar. 26, 2024

(54) 5G-4G AUTHENTICATION DATA COEXISTENCE

(71) Applicant: Telefonaktiebolaget LM Ericsson (PUBL), Stockholm (SE)

(72) Inventors: Maria Cruz Bartolomé Rodrigo, Madrid (ES); Laura Roda Bruce, Madrid (ES); Alfonso Celaya Prieto, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 237 days.

(21) Appl. No.: 17/421,042

(22) PCT Filed: Dec. 5, 2019

(86) PCT No.: PCT/EP2019/083772
§ 371 (c)(1),
(2) Date: Jul. 7, 2021

(87) PCT Pub. No.: WO2020/143965
PCT Pub. Date: Jul. 16, 2020

(65) Prior Publication Data
US 2022/0060897 A1   Feb. 24, 2022

(30) Foreign Application Priority Data
Jan. 11, 2019  (EP) .................................. 19382019

(51) Int. Cl.
*H04L 29/06* (2006.01)
*H04W 8/20* (2009.01)
(Continued)

(52) U.S. Cl.
CPC ........... *H04W 12/068* (2021.01); *H04W 8/20* (2013.01); *H04W 12/03* (2021.01)

(58) Field of Classification Search
CPC ...... H04W 12/03; H04W 12/068; H04W 8/20
See application file for complete search history.

(56) References Cited

U.S. PATENT DOCUMENTS

2018/0123804 A1* 5/2018 Smith ................. H04W 12/069

FOREIGN PATENT DOCUMENTS

| EP | 1 465 385 A1 | 10/2004 |
|---|---|---|
| EP | 2 941 032 A1 | 11/2015 |
| JP | 2018195873 | * 5/2017 |

OTHER PUBLICATIONS

3GPP TR 23.732 v1.0.0; Technical Report; 3rd Generation Partnership Project; Technical Specification Group Services and System Aspects; Study on User data interworking, Coexistence and Migration (Release 16)—Dec. 2018.
(Continued)

*Primary Examiner* — Joseph P Hirl
*Assistant Examiner* — Chi D Nguy
(74) *Attorney, Agent, or Firm* — BAKER BOTTS L.L.P.

(57) ABSTRACT

Exemplary embodiments include a method for managing user authentication credentials in relation to different types of core networks, CNs. The exemplary methods can include receiving (1010) a request to authenticate a user for access via a first CN, and determining (1020) that user authentication credentials are unavailable in relation to the first CN. The exemplary methods can also include sending (1030), to a translator function associated with a second CN that is different than the first CN, a request to provide user authentication credentials associated with the first CN. The exemplary methods can also include receiving (1040) user authentication credentials associated with the first CN and, based on the received user authentication credentials, authenticating (1050) the user for access via the first CN. Embodiments also include data management nodes config-
(Continued)

ured to perform the exemplary methods, as well as complementary methods and nodes configured to perform such methods.

17 Claims, 19 Drawing Sheets

(51) Int. Cl.
*H04W 12/03* (2021.01)
*H04W 12/06* (2021.01)

(56) References Cited

OTHER PUBLICATIONS

3GPP TS 23.501 v15.3.0; Technical Specification; 3rd Generation Partnership Project; Technical Specification Group Services and System Aspects; System Architecture for the 5G System; Stage 2 (Release 15)—Sep. 2018.
3GPP TS 23.502 v15.3.0; Technical Specification; 3rd Generation Partnership Project; Technical Specification Group Services and System Aspects; Procedures for the 5G System; Stage 2 (Release 15)—Sep. 2018.
PCT International Search Report issued for International application No. PCT/EP2019/083772—dated Feb. 14, 2020.
PCT Written Opinion of the International Searching Authority issued for International application No. PCT/EP2019/083772—dated Feb. 14, 2020.
3GPP TS 29.505 v15.1.0; Technical Specification; 3rd Generation Partnership Project; Technical Specification Group Core Network and Terminals; 5G System; Usage of the Unified Data Repository services for Subscription Data; Stage 3 (Release 15)—Sep. 2018.
Communication Pursuant To Article 94(3) EPC issued for Application No. 19 817 228.0-1218—dated Mar. 3, 2023.

* cited by examiner

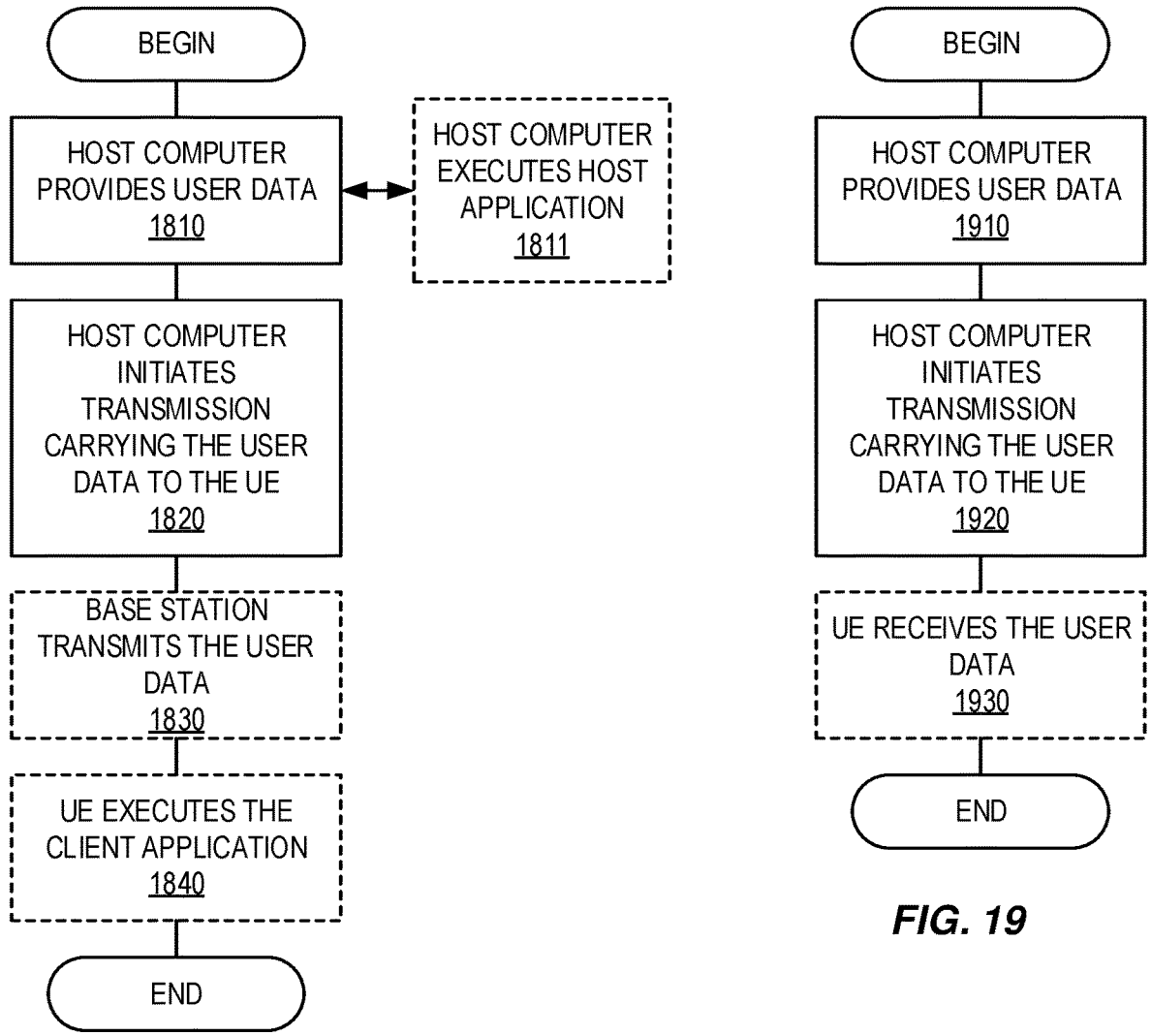

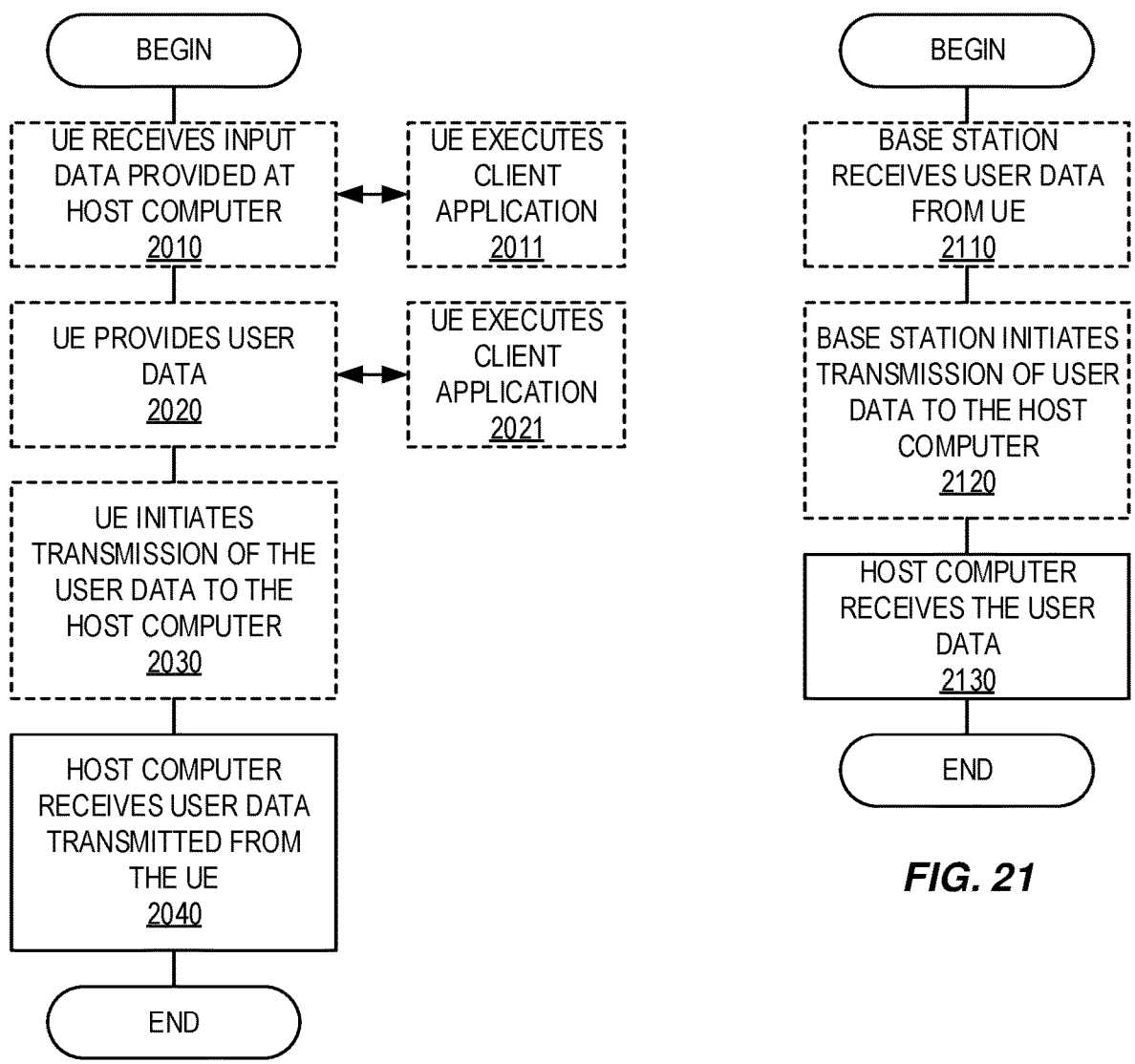

5G-4G AUTHENTICATION DATA COEXISTENCE

PRIORITY

This nonprovisional application is a U.S. National Stage Filing under 35 U.S.C. § 371 of International Patent Application Serial No. PCT/EP2019/083772 filed Dec. 5, 2019 and entitled "5G-4G AUTHENTICATION DATA COEXISTENCE" which claims priority to European Patent Application No. 19382019.8 filed Jan. 11, 2019 both of which are hereby incorporated by reference in their entirety.

TECHNICAL FIELD

The present application relates generally to the field of telecommunications and more specifically to compatibility of user authentication data between different types of core networks that can be associated with a wireless communication network serving the user.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

In 3GPP, a study item on a new radio interface for a fifth-generation (5G) cellular (e.g., wireless) network has recently been completed. 3GPP is now standardizing this new radio interface, often abbreviated by NR (New Radio). FIG. 3 illustrates a high-level view of the 5G network architecture, consisting of a Next Generation RAN (NG-RAN) 390 and a 5G Core (5GC) 398. NG-RAN 390 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect to the NR interface to UEs, each of the gNBs can support frequency division duplexing (FDD), time division duplexing (TDD), or a combination thereof.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 3 (and described in TS 38.401 and TR 38.801) include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

The gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. Furthermore, the F1 interface between the gNB-CU and gNB-DU is specified, or based on, the following general principles:

F1 is an open interface.
F1 supports the exchange of signaling information between respective endpoints, as well as data transmission to the respective endpoints.
from a logical standpoint, F1 is a point-to-point interface between the endpoints (even in the absence of a physical direct connection between the endpoints).
F1 supports control plane (CP) and user plane (UP) separation, such that a gNB-CU may be separated in CP and UP.
F1 separates Radio Network Layer (RNL) and Transport Network Layer (TNL).
F1 enables exchange of UE-associated information and non-UE associated information.
F1 should be future-proof with respect to new requirements, services, and functions.
A gNB terminates X2, Xn, NG and S1-U interfaces and, for the F1 interface between DU and CU, utilizes the F1 application part protocol (F1-AP) which is defined in 3GPP TS 38.473.

As briefly mentioned above, a CU can host higher-layer protocols such as, e.g., F1-AP, Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. FIG. 4 shows an exemplary gNB architecture based on the DU-CU split and the further separation between CU-CP and CU-UP.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) wherein Network Functions provide one or more services to one or more service consumers. This can be done, for example, by Hyper Text Transfer Protocol/Representational State Transfer (HTTP/REST) application programming interfaces (APIs). The services are composed of various "service operations", which are more granular divisions of the overall service functionality. In order to access a service, both the service name and the targeted service operation must be indicated. The interactions between service consumers and producers can be of the type "request/response" or "subscribe/notify".

FIG. 5 shows an exemplary non-roaming 5G reference architecture with service-based interfaces and various network functions within the Control Plane (CP). These include:

Access and Mobility Management Function (AMF) with Namf interface;
Session Management Function (SMF) with Nsmf interface;
User Plane Function (UPF) with Nupf interface;
Policy Control Function (PCF) with Npcf interface;
Network Exposure Function (NEF) with Nnef interface;
Network Repository Function (NRF) with Nnrf interface;
Network Slice Selection Function (NSSF) with Nnssf interface;
Authentication Server Function (AUSF) with Nausf interface;
Application Function (AF) with Naf interface; and
Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by the NEF.

In order to support smooth migration between EPC and 5GC, it is assumed that both EPC and 5GC have access to a common subscriber database that acts as the master database for a given user (as defined in 3GPP TS 23.002). In other words, there should be a common subscriber database that encompasses both HSS/EPC-UDR functionality and UDM/UDR functionality. As noted above, however, access to encrypted data stored in EPC-UDR is limited by proprietary data model involving propriety authentication and/or encryption protocols.

SUMMARY

Accordingly, exemplary embodiments of the present disclosure address these and other difficulties in mobility of UEs between different types of networks such as LTE and NR.

Exemplary embodiments of the present disclosure include methods and/or procedures for managing user authentication credentials in relation to different types of core networks (CNs). The exemplary methods and/or procedures can be performed by a data management node (e.g., UDM) in a first CN (e.g., 5GC). The exemplary methods and/or procedures can include receiving a request to authenticate a user for access via a first CN. The request can be received, for example, from an Authentication Support Function (AUSF) in a 5GC network. The exemplary methods and/or procedures can also include determining that user authentication credentials are unavailable in relation to the first CN. This determination can be based on, for example, querying a subscriber data repository associated with the first CN.

The exemplary methods and/or procedures can also include sending, to a translator function associated with a second CN that is different than the first CN, a request to provide user authentication credentials associated with the first CN. The exemplary methods and/or procedures can also include receiving user authentication credentials associated with the first CN, e.g., from the translator function. In some embodiments, the received user authentication credentials can be encrypted using an encryption mechanism associated with the first CN. The exemplary method and/or procedure can also include, based on the received user authentication credentials, authenticating the user for access via the first CN. In embodiments where the received user authentication credentials are encrypted, the authentication operations can include decrypting the received user authentication credentials. User authentication vectors can also be generated from the (decrypted) user authentication credentials, and the authentication can be based on the authentication vectors.

In some embodiments, the exemplary methods and/or procedures can also include re-encrypting the decrypted user authentication credentials using the encryption mechanism associated with the first CN. In such embodiments, the exemplary methods and/or procedures can also include storing the re-encrypted user authentication credentials in a first data repository associated with the first CN, such that the credentials are available for further use.

Other exemplary embodiments of the present disclosure include methods and/or procedures for providing user authentication credentials for a second core network (CN) that is different from a first CN, that is, for managing user authentication credentials in relation to different types of core networks, CNs. The exemplary methods and/or procedures can be performed by an encrypted credentials translator function, node, and/or service (e.g., a 4G-5G encrypted credentials translator) associated with the second CN (e.g., 4G EPC). The exemplary methods and/or procedures can include receiving, from a data management node associated with the first CN, a request to provide user authentication credentials associated with the first CN. For example, the data management node can be a user data management (UDM) function and/or node in a 5GC network. The exemplary methods and/or procedures can also include retrieving user authentication credentials associated with the second CN. The exemplary methods and/or procedures can also include translating the retrieved user authentication credentials into user authentication credentials associated with the first CN. In some embodiments, the translating operations can include decrypting the encrypted user authentication credentials and re-encrypting the decrypted user authentication credentials based on an encryption mechanism associated with the first CN. The exemplary methods and/or procedures can also include providing the translated user authentication credentials to the data management node.

Other exemplary embodiments include additional methods and/or procedures for managing user authentication credentials in relation to different types of core networks (CNs). The exemplary methods and/or procedures can be performed by a subscriber server (e.g. Home Subscriber Server, HSS) in a second CN (e.g., EPC). The exemplary methods and/or procedures can include receiving a request to authenticate a user for access via a second CN. For example, the node can receive the request from a mobility management entity (MME) in a 4G EPC. The exemplary methods and/or procedures can also include determining that user authentication credentials are unavailable in relation to the second CN. In some embodiments, this determining operation can include sending a request for the credentials to a data repository associated with the second CN (e.g., an EPC-UDR), and receiving an indication, in response, that the credentials have been deleted or converted to credentials in relation to a first CN (e.g., 5GC) that is different than the second CN.

The exemplary method and/or procedure can also include sending, to a data management node associated with the first CN that is different than the second CN, a request to provide user authentication credentials associated with the second CN. The exemplary methods and/or procedures can also include receiving, from the data management node, user authentication credentials associated with the second CN. The exemplary methods and/or procedures can also include, based on the received user authentication credentials, authenticating the user for access via the second CN.

Other exemplary embodiments include data management nodes and/or functions (e.g., UDM, HSS, or components thereof) and translator nodes, functions, and/or services (e.g., 4G-5G encrypted credentials translator) configured to perform operations corresponding to the exemplary methods and/or procedures. Other exemplary embodiments include non-transitory, computer-readable media storing computer-executable instructions that, when executed by a processing circuit comprising a network node, configure the network node to perform operations corresponding to the exemplary methods and/or procedures. Other exemplary embodiments include telecommunication networks comprising various network nodes and/or functions that interoperate in a manner corresponding to the exemplary methods and/or procedures.

BRIEF DESCRIPTION OF THE DRAWINGS

FIGS. 18-21 are flow diagrams of exemplary methods and/or procedures for transmission and/or reception of user data that can be implemented, for example, in the exemplary communication systems and/or networks illustrated in FIGS. 16-17.

DETAILED DESCRIPTION

Figure 1:
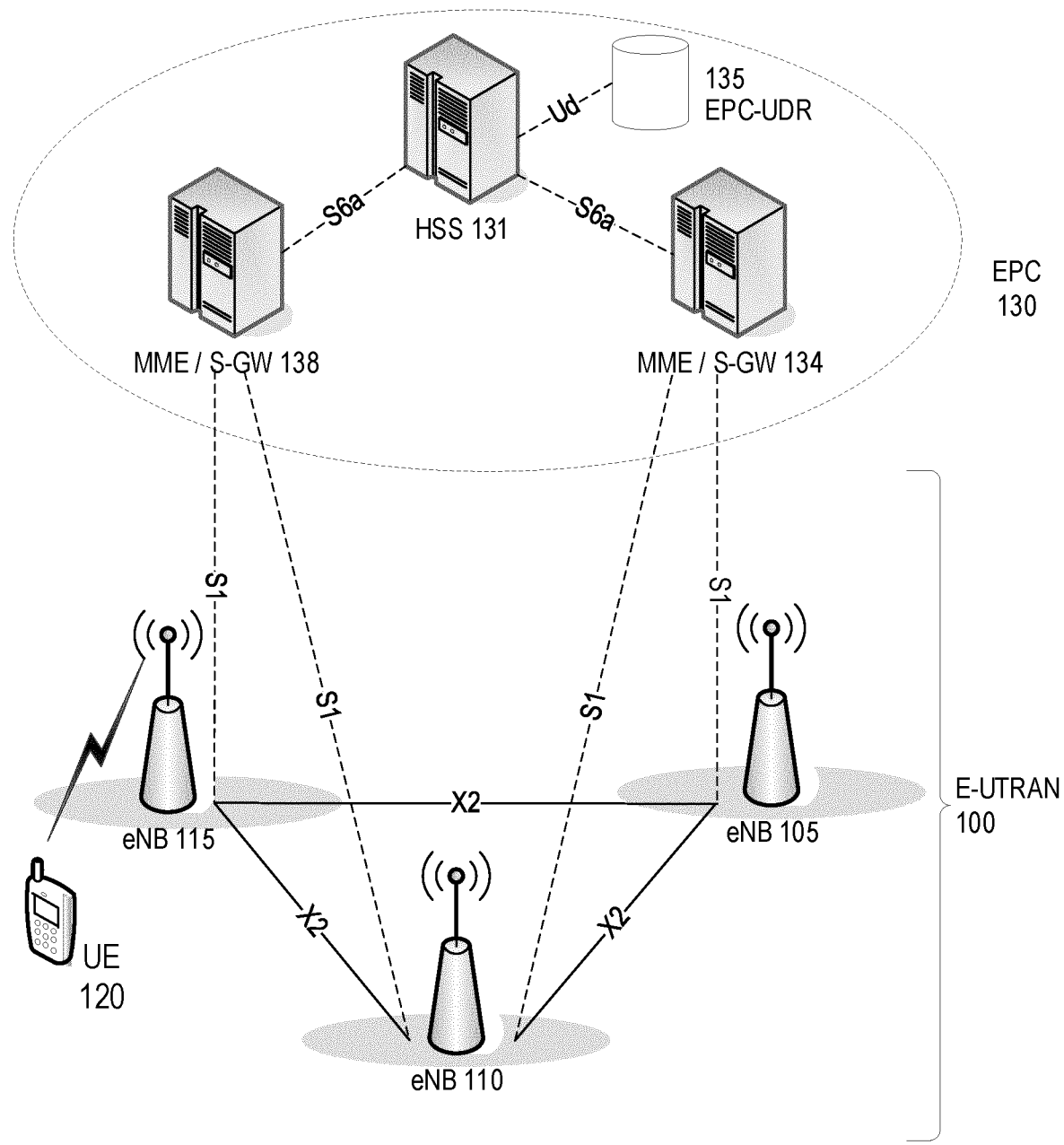
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
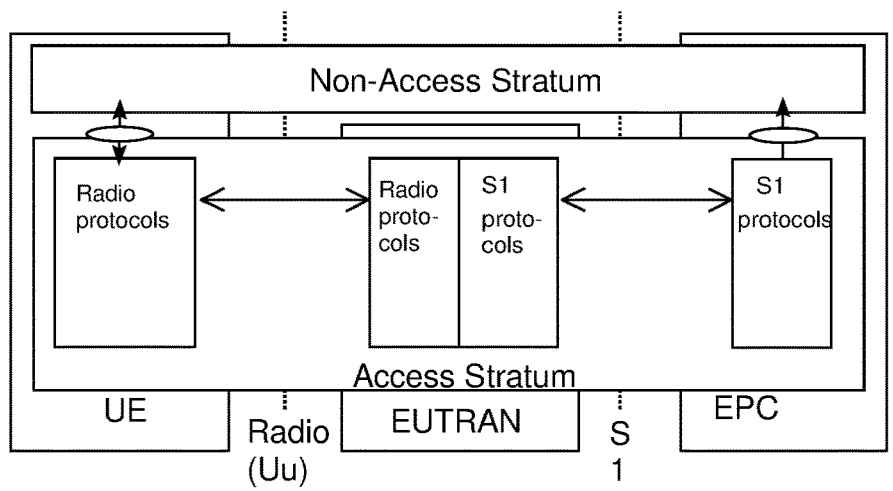
FIG. 2A is a high-level block diagram of an exemplary E-UTRAN architecture in terms of its constituent components, protocols, and interfaces.
Figure 2B:
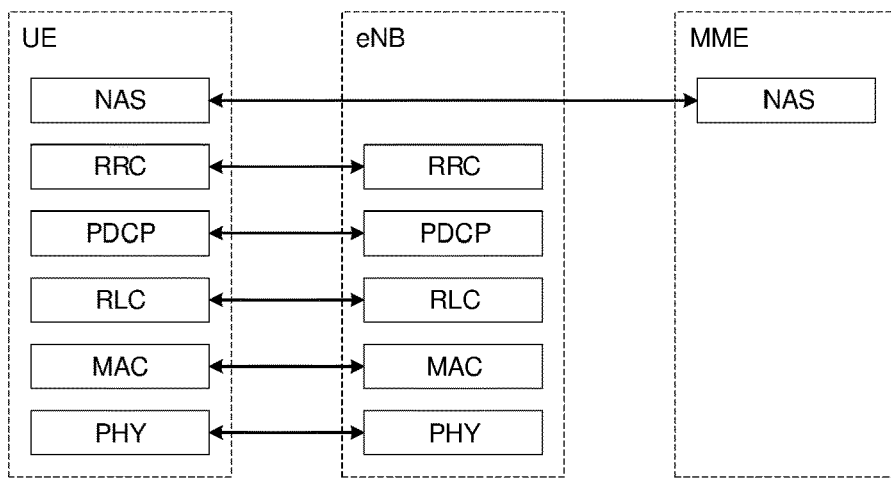
FIG. 2B is a block diagram of exemplary protocol layers of the control-plane portion of the radio (Uu) interface between a user equipment (UE) and the E-UTRAN.
Figure 2C:
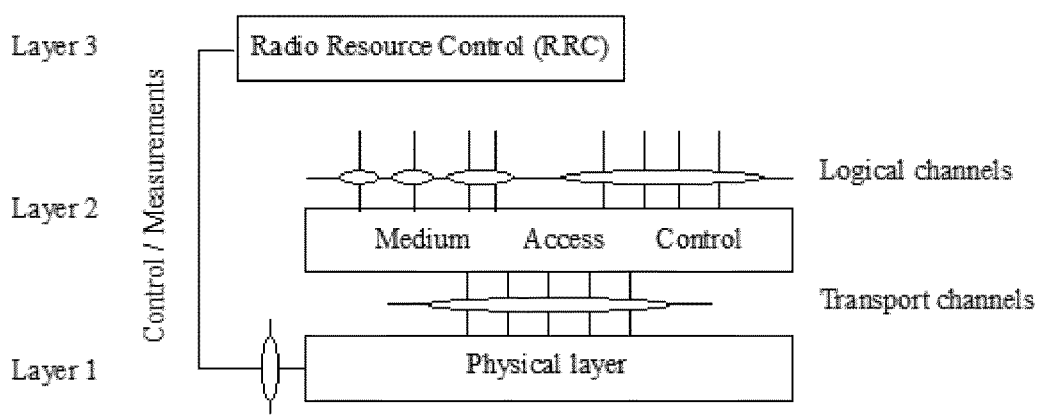
FIG. 2C is a block diagram of an exemplary LTE radio interface protocol architecture from the perspective of the PHY layer.
Figure 3:
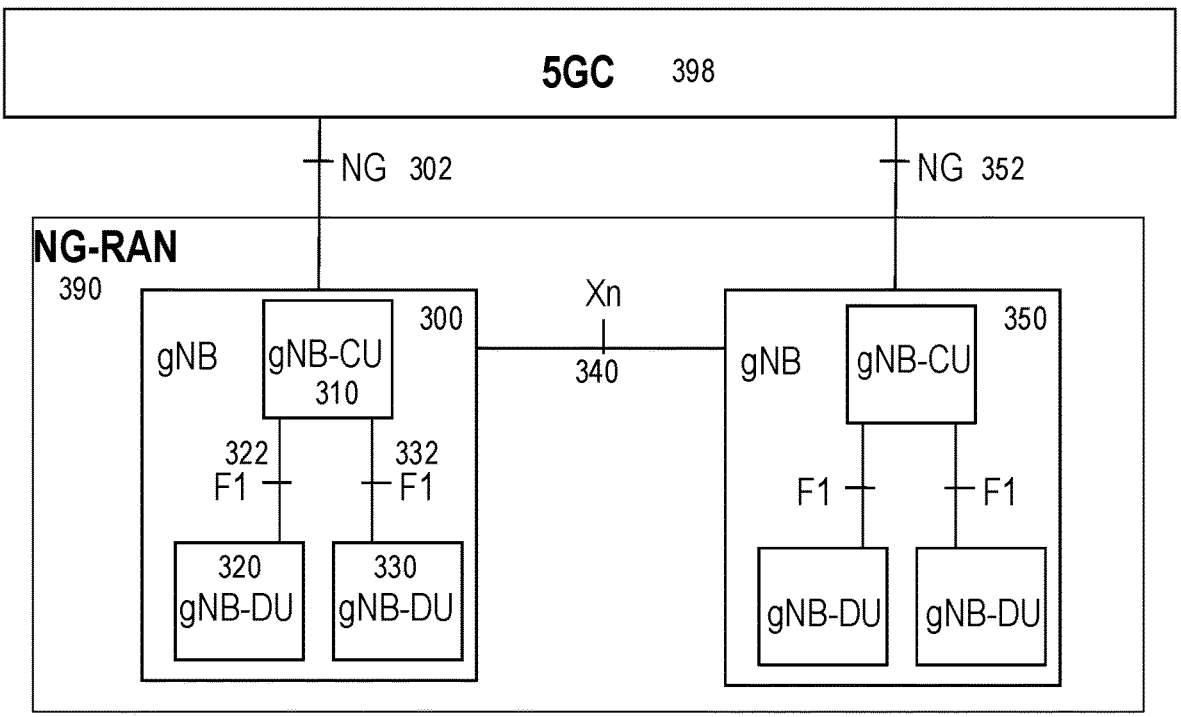
FIG. 3 illustrates a high-level view of the 5G network architecture, including split central unit (CU)-distributed unit (DU) split architecture of gNBs.
Figure 4:
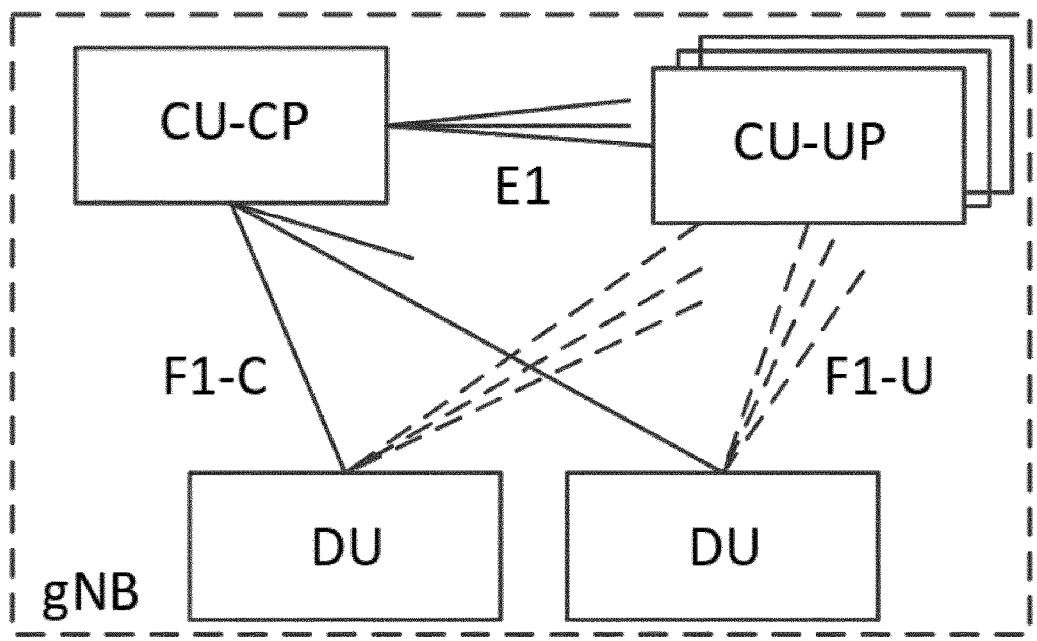
FIG. 4 illustrates the control-plane (CP) and user-plane (UP) interfaces within the split CU-DU architecture shown in FIG. 3.
Figure 5:
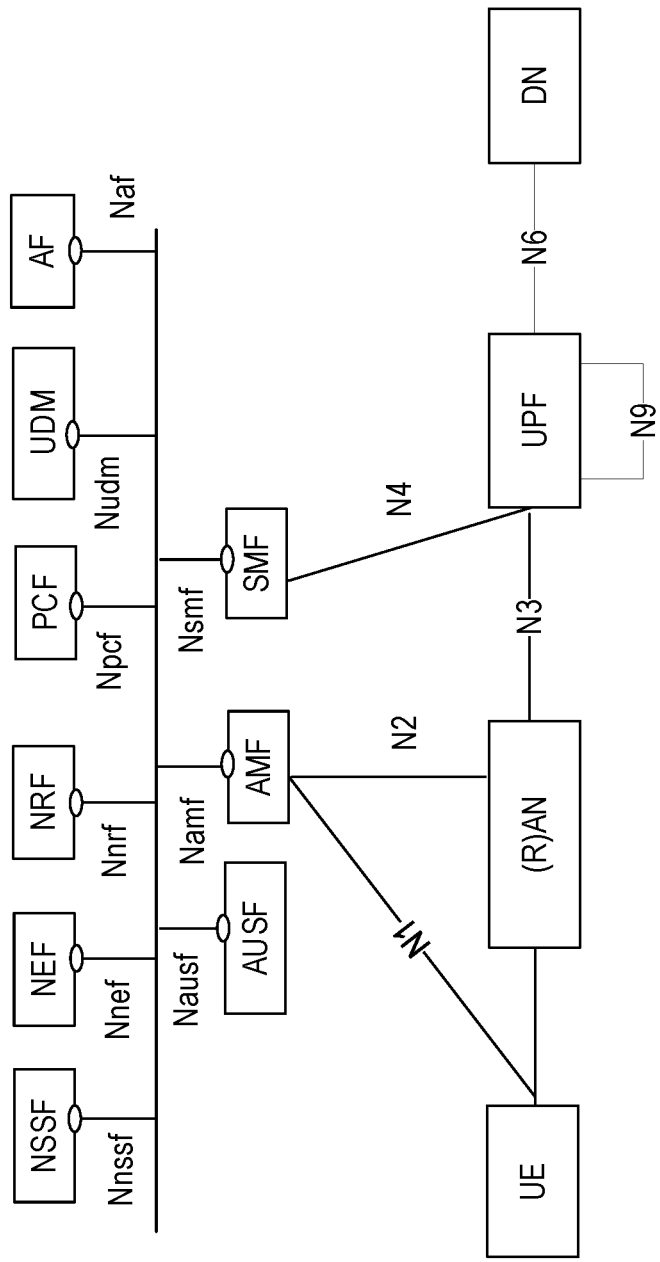
FIG. 5 shows an exemplary non-roaming 5G reference architecture with service-based interfaces and various network functions within the control plane (CP), as further explained in 3GPP TS 23.501.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "node" or "network node" is any node that is part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

As discussed above, in order to support smooth migration between EPC and 5GC, it is assumed that both EPC and 5GC have access to a common subscriber database that acts as the master database for a given user (as defined in 3GPP TS 23.002). In other words, there should be a common subscriber database that encompasses both HSS/EPC-UDR functionality and UDM/UDR functionality. As noted above, however, access to encrypted data stored in EPC-UDR is limited by proprietary data model involving propriety authentication and/or encryption protocols. These are discussed below in more detail.

In 4G networks, the interface between HSS(AuC) and EPC UDR is Ud, in which the data model is not standardized (i.e., it is vendor-specific). So long as both HSS(AuC) and EPC UDR in any deployment are provided by the same vendor, having proprietary data encrypted by AuC and stored in EPC-UDR is not a problem. In 5G networks, however, the data is stored in newly-defined (5G) UDR, which is accessible by the standardized Nudr interface. As such, UDM and UDR may be from different vendors. Currently the credentials for 5G subscribers are unencrypted, but if the standards are updated to include credentials encryption, then Nudr should also be updated to include a data model that considers the authentication data required for that encryption. For example, the encryption mechanism will need to be standardized.

This can create various problems for 4G network users who are also enabled as 5G network users, whereby user credentials must be accessed from both network types. When the user credentials are accessed from 4G, they will be read by HSS(AuC) from EPC-UDR (via Ud) and then the known, proprietary, decryption will be applied. On the other hand, when the user credentials are accessed from 5G, they will be read by UDM from UDR and the standards-based decryption will be applied.

For unified 4G-5G data storage, one approach would be to have two separate user credentials, each accessible by a different network type. However, this can be undesirable from a security standpoint. One of the encryption secret key parameters is SQN, a four-octet sequence number that is refreshed each time a network tries to authenticate the user. Duplication of security keys can lead to SQN reuse and, consequently, synchronization errors. As such, it is desirable that any duplication of secret keys should be avoided except for backup purposes. But if only one single set of credentials is required, for 4G users enabled as 5G users, currently this single set cannot be accessed from both 4G and 5G networks having different reference points (Ud vs. Nudr), different protocols (LDAP vs. HTTP/REST), different data models (proprietary vs. new Nudr to be defined), and different encryption mechanisms (proprietary vs. new Nudr to be defined).

Exemplary embodiments of the present disclosure address these and other problems, challenges, and/or issues by providing mechanism that can perform a per-traffic update of encryption mechanisms of authentication credentials. For example, the first time authentication credentials are read by a 5G consumer (e.g, a UDM), the 5G consumer executes a service (e.g., "4G to 5G encrypted credentials translator") that is able to decrypt vendor-proprietary 4G credentials and then re-encrypt (as needed) the decrypted credentials using another encryption mechanism (e.g., a new 5G standard). The newly-created 5G encrypted credentials can then be stored in UDR, so that the next time a 5G consumer requires authentication credentials for the same subscriber, the stored credentials are available. The existing 4G-encrypted credentials can remain stored in EPC-UDR until there are no more 4G consumers (e.g., HSS) that require 4G credentials for that user (e.g., when the user no longer accesses 4G networks). Although the translator service and the 4G HSS/EPC-UDR should be provided by the same vendor, the remainder of services that utilize the 5G user credentials can be provided by different vendors.

The enhancements and/or operational improvements provided by exemplary embodiments promote coexistence and compatibility of 4G and 5G networks by facilitating coexistence of 4G and 5G user credentials that use different encryption mechanisms. Exemplary embodiments also facilitate the migration and/or upgrade of vendor-specific 4G encryption of user credentials to a standardized 5G encryption mechanism. Embodiments also minimize and/or reduce processing and signalling resource requirements by making 5G user credentials available to subsequent consumers after initial creation. Embodiments also facilitate deployments of 5G UDR and 4G HSS/EPC-UDR from different vendors, while keeping subscriber encryption parameters under control of a single vendor, the one that originally encrypted the user credentials.

In addition, embodiments can keep encrypted user credentials available for both 4G and 5G accesses, while using only a single set of corresponding encryption parameters (e.g., SQN). This avoids synchronization errors that can occur when two credentials sets, including secret key parameters, are kept in different places.

Furthermore, embodiments facilitate the inclusion of 5G non-standardized (e.g., operator-specific) encryption mechanisms or variants with future 5G standardized encryption mechanisms. For example, operators are able to use other encryption mechanisms as required and/or desired, while avoiding any modification of credentials.

The following description of exemplary embodiments is based on the typical current deployment situation where HSS and EPC-UDR and provided by the same vendor and credentials for 4G network users are stored in EPC-UDR. Moreover, the description focuses on certain ones of these 4G network users who are also enabled as 5G network users, e.g., via subscribed capability. The description focuses on two aspects: the first 5G network access by the 5G-enabled user, and subsequent 4G network accesses by the same user.

Figure 6A:
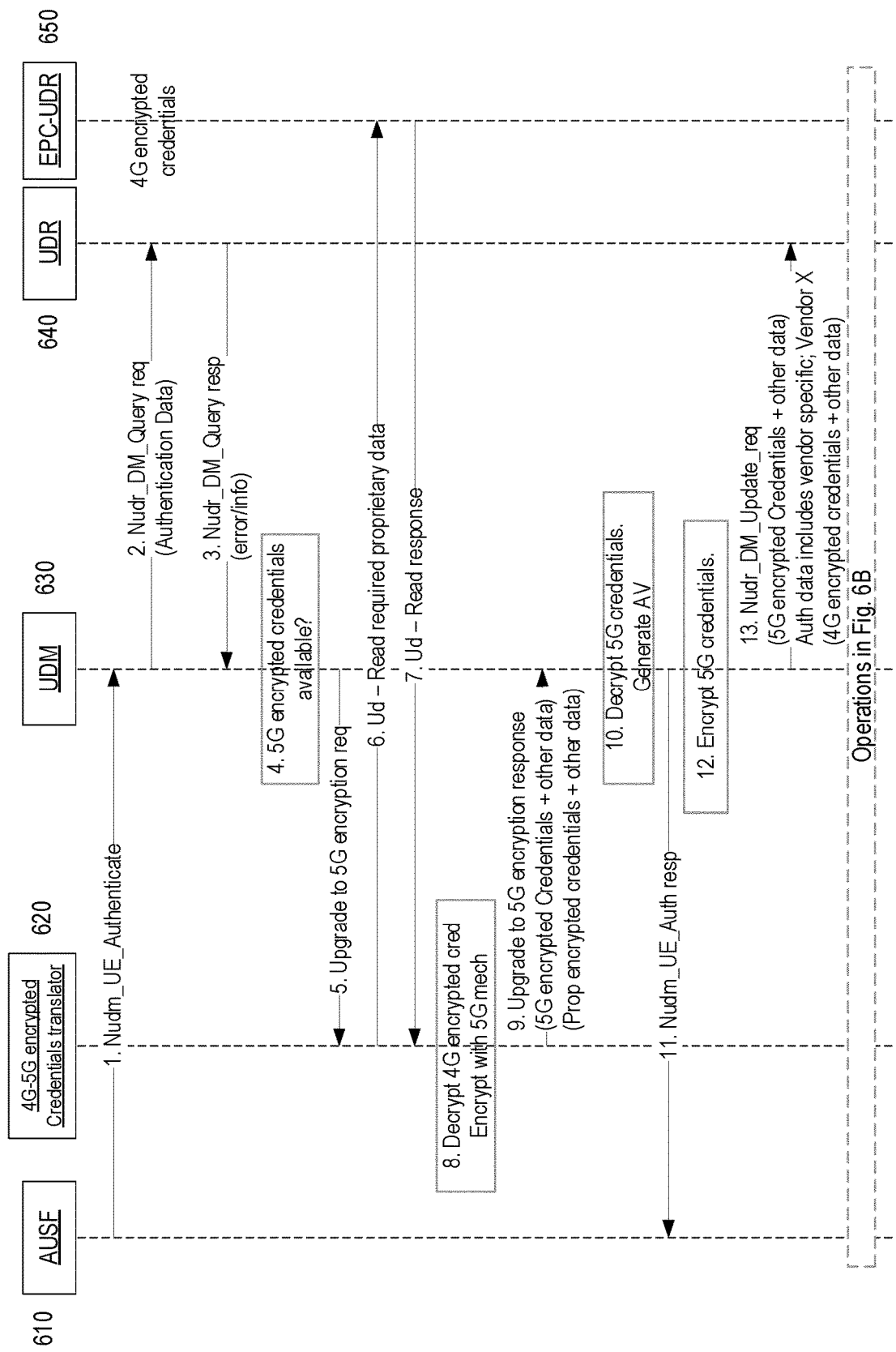
FIG. 6, which consists of FIGS. 6A and 6B, shows an exemplary signalling diagram among various core network entities in relation to an initial 5G network access for a 5G-enabled user, according to various exemplary embodiments of the present disclosure.
Figure 6B:
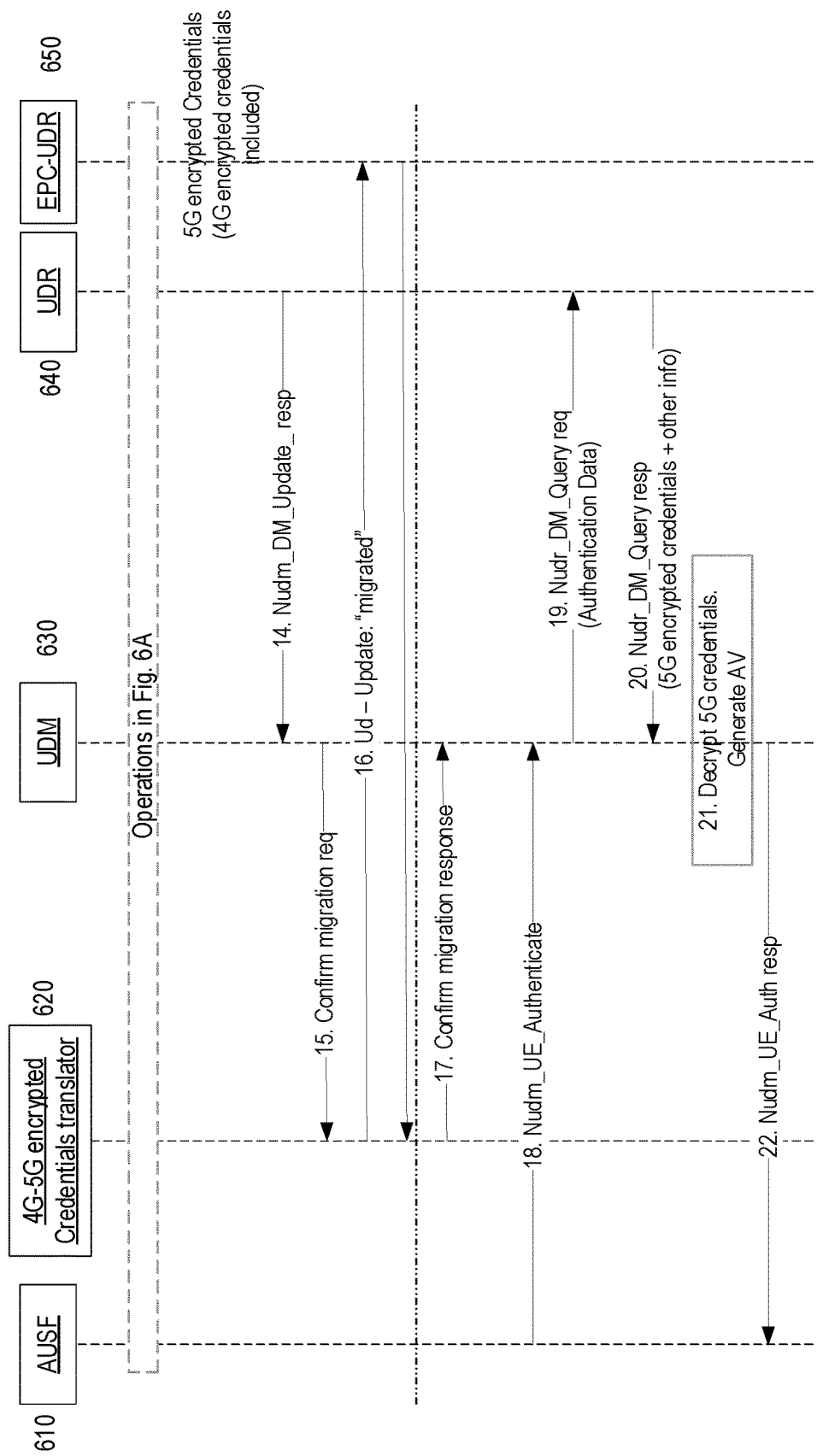

FIG. 6, which consists of FIGS. 6A and 6B, shows an exemplary signalling diagram among various core network entities in relation to an initial 5G network access for a 5G-enabled user, according to various exemplary embodiments of the present disclosure. Although the various operations in FIG. 6 are labelled with numbers, these numbers are merely for facilitating explanation and neither require nor suggest the operations to be performed in a particular order, unless specifically stated in the following explanation. Furthermore, the operations shown can be combined and/or divided into operations having different functionality than shown in FIG. 6. In addition, the exemplary method and/or procedure shown in FIG. 6 can be complementary to other exemplary methods and/or procedures disclosed herein, such that they are capable of being used cooperatively to provide the benefits, advantages, and/or solutions to problems described hereinabove.

Although not shown, in response to a particular user's (also referred to as a "subscriber") request to access the 5G network, the Access and Mobility Management Function (AMF) in the 5G network can select a particular Authentication Server Function (AUSF) to perform authentication between the UE and 5GC. In operation 1, the selected AUSF requests the UDM function to execute the authentication operation for the user. In operation 2, upon receiving the request, the UDM determines that it needs to fetch authentication information for that subscriber, and sends a request (e.g., query) to the 5GC UDR via the Nudr interface. In this example, the subscriber is assumed to be 5G-enabled but the authentication credentials remain as in 4G, i.e., encrypted by a 4G core network vendor. However, this vendor is not required to also be the vendor of the 5G entities such as UDR, UDM, AMF, or AUSF.

Since only 4G encrypted credentials are available, the Nudr query in operation 2 cannot return the 4G credentials since they are stored using Ud with a proprietary data model. Accordingly, in operation 3, the Nudr response will return either an error or some information identifying that only 4G encrypted credentials are available.

In operation 4, the UDM determines, based on response received in operation 3, whether 5G encrypted credentials are available for the subscriber. If available, the signalling flow proceeds to operation 10. Otherwise, UDM needs to execute operation 5, shown as "Upgrade to 5G encrypted credentials". This action is shown in FIG. 6 as a message sent by UDM to a "4G to 5G encrypted credentials translator" procedure, the message including at least the subscriber identification. This procedure could be implemented as a new service, module, or network function (NF), such as described above.

In general, the UDM may be from a different vendor than the HSS and EPC-UDR, so long as Nudr is standardized to accommodate this multi-vendor compatibility. As such, the "4G to 5G encrypted credentials translator" function can be implemented as a service that is independent from UDM, and it may be discovered using NRF (or by configuration), similar to other SBA services. As briefly mentioned above, in this multi-vendor arrangement, the "4G to 5G encrypted credentials translator" function can be provided by the same vendor as the HSS/EPC-UDR, thereby facilitating decryption of the vendor-proprietary 4G encryption.

In case of single vendor of HSS/EPC-UDR and UDM, the "4G to 5G encrypted credentials translator" can be implemented in the Authentication credential Repository and Processing Function (ARPF), which can be part of or associated with the UDM. In this case, encryption (see operation 8, described below) and decryption (operation 10) are not required, so long as the information is not exchanged between two vendors by a network connection. In operation 6, the "4G-5G encrypted credential translator" service requests from EPC-UDR the required subscriber authentication data, using the proprietary data model over the Ud interface. A response is received in operation 7, including 4G encrypted credentials and any other required information to be able decrypt the credentials. Based on this information, in operation 8, the "4G-5G encrypted credential translator" service decrypts the credentials and then re-encrypts them using a standardized 5G encryption mechanism. However, this re-encryption operation is optional depending, e.g., on whether a standardized 5G credentials encryption mechanism is available.

In some embodiments, instead of 5G standard encryption mechanism, an operator can define other proprietary 5G encryption mechanisms that the UDM can be instructed to select and apply in operation 8. This could be the case when UDM and "4G-5G encrypted credential translator" are provided by the same vendor, or in a multi-vendor arrangement where the operator has requested custom implementation for both vendors. In these embodiments, in operation 8, the "4G-5G encrypted credential translator" can generate the "operator proprietary encrypted credential."

In operation 9, "4G-5G encrypted credential translator" sends to the UDM the 5G encrypted credentials along with any other information that is required for decryption, such as an identification of the encryption mechanism used (e.g., "operation proprietary encryption").

Non-standard encryption mechanisms (and related required data) can be conveyed in a proprietary extension field of the service operation. In operation 10, the UDM proceeds similarly as if it received 5G encrypted credentials (and any other required information) in operation 3. In other words, it decrypts the 5G encrypted credentials and generates required Authentication Vectors as requested in operation 1. In operation 11, the UDM responds to the AUSF indicating that the user has been authenticated.

In operations 12-13, the UDM re-encrypts the credentials using either a 5G standardized or operator-proprietary encryption (according to the embodiment) and stores the 5G encrypted credentials in UDR via the Nudr interface. In operation 14, the UDM receives a UDR response indicating successful credential storage. In this manner, former 4G encrypted credentials can be upgraded to 5G encrypted credentials and can be used directly for user 5G network accesses, while 4G encrypted credentials can remain untouched and available for use when the 5G-enabled user accesses a 4G network (described below in relation to FIG. 7).

In operation 15, once 5G encrypted credentials have been successfully stored in UDR, UDM sends a request to the "4G-5G encrypted credential translator" to confirm that the migration of credentials for that particular user was successful. After receiving this confirmation, in operation 16, the "4G-5G encrypted credential translator" updates authentication proprietary information in the EPC-UDR, thereby allow subsequent EPC-UDR reads to identify that the authentication data has already been "migrated" to 5G UDR. This vendor proprietary data can be included in a proprietary, non-standardized extension. For example, this information can be stored in a binary format to avoid identification and interpretation of this proprietary information by other vendors (e.g., competitors).

In other embodiments of operation 16, the "4G-5G encrypted credential translator" can delete the 4G credentials in the EPC-UDR. This is explained in more detail below. In operation 17, the "4G-5G encrypted credential translator" responds to UDM with an indication that the 4G encrypted credentials have been successfully marked as "migrated" (or alternatively deleted).

In operation 18, the Authentication Server Function (AUSF) in the 5GC requests the UDM function to execute the Authentication operation for the same user. In operation 19, upon receiving the request, the UDM determines that it needs to fetch authentication information for that subscriber, and sends a request (e.g., query) to the 5GC UDR via the Nudr interface. For this user, however, 5G encrypted credentials exist and are successfully returned in operation 20. Operations 21-22 are similar to operations 10-11, described above.

Figure 7:
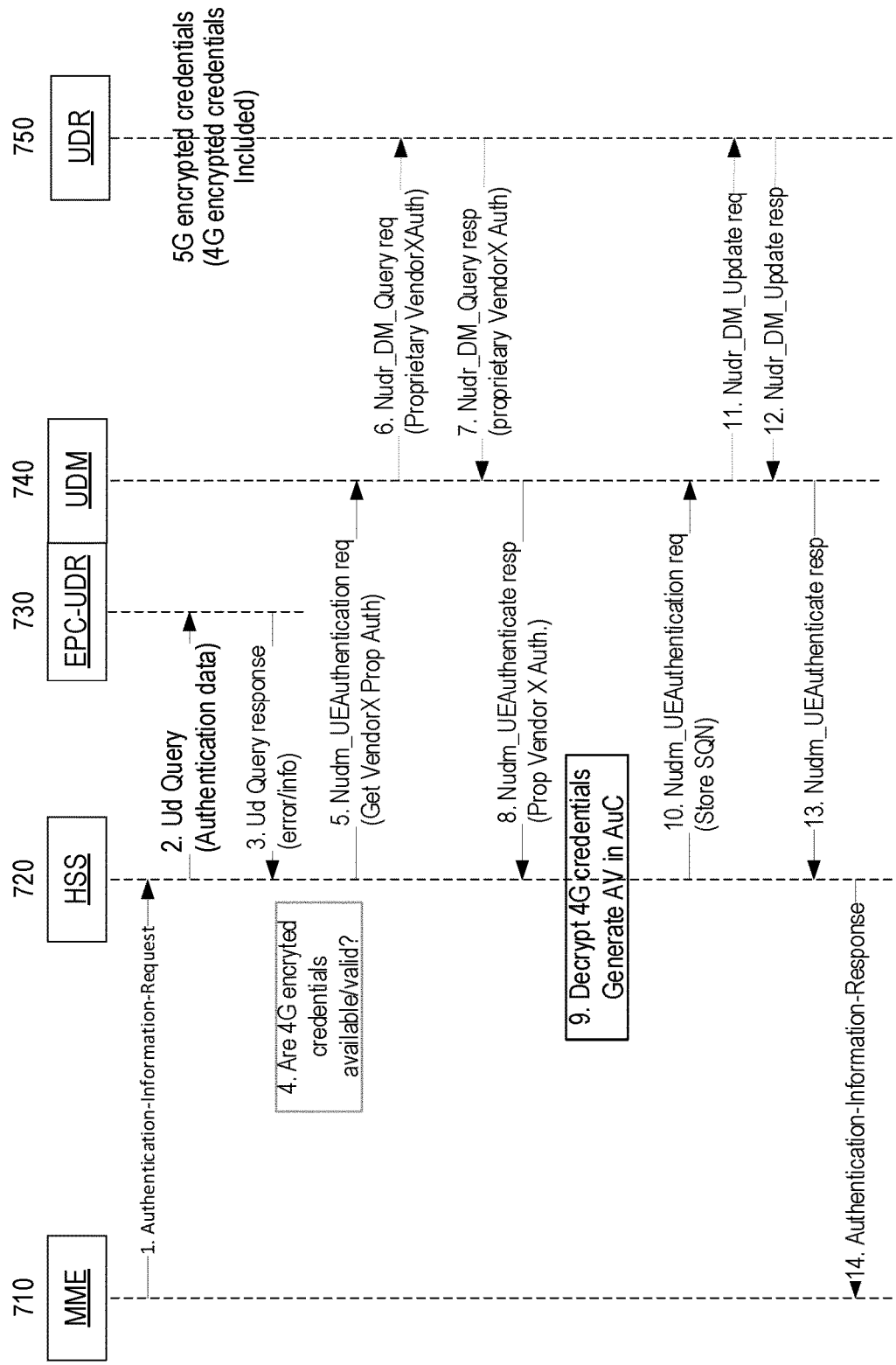
FIGS. 7-9 show exemplary signalling diagrams among various core network entities in relation to subsequent 4G network access for a 5G-enabled user, according to various exemplary embodiments of the present disclosure.

FIG. 7 shows an exemplary signalling diagram among various core network entities in relation to subsequent 4G network access for a 5G-enabled user, according to various exemplary embodiments of the present disclosure. Although the various operations in FIG. 7 are labelled with numbers, these numbers are merely for facilitating explanation and neither require nor suggest the operations to be performed in a particular order, unless specifically stated in the following explanation. Furthermore, the operations shown can be combined and/or divided into operations having different functionality than shown in FIG. 7. In addition, the exemplary method and/or procedure shown in FIG. 7 can be complementary to other exemplary methods and/or procedures disclosed herein, such that they are capable of being used cooperatively to provide the benefits, advantages, and/or solutions to problems described hereinabove.

In operation 1, an MME in the EPC sends an authentication requests for a particular user (who is accessing the 4G network) to the HSS. In operation 2, the HSS requests the authentication information from EPC-UDR using Ud interface and proprietary data model. In operation 3, the EPC-UDR response indicates that the authentication information for that subscriber has been migrated to 5G network credentials, or alternatively that the Authentication information for that subscriber is empty (e.g., it was previously deleted in accordance with the above description).

In operation 4, the HSS checks this received indication. If the 4G encrypted credentials are not available (either deleted or marked as "migrated"), then in operation 5, the HSS executes a service to get vendor proprietary authentication data from UDM. In the figure, this service is shown as part of the existing Nudm UEAuthenticate service of the 5GC SBA, but in other embodiments it can be a new service. The request for vendor proprietary authentication data can include a Vendor identification.

In operations 6-8, the UDM queries UDR for the requested vendor-proprietary information, the UDR returns the information, and the UDM sends the received information to the requesting HSS. In operation 9, the HSS (e.g., the AuC functionality) uses the received proprietary information to decrypt the 4G credentials and generate Authentication Vectors. In operation 10, the HSS sends a request for the UDM to store the updated authentication information including, e.g., the SQN. In operations 11-12, the UDM successfully stores this updated information in the UDR. In this manner, even though two credential sets are stored and encrypted using different algorithms, the sequence or/and timing is maintained in a single repository, i.e., the 5G UDR.

In operation 13, the UDM sends a response to the HSS indicating successful update of the user's authentication information. In operation 14, the HSS provides the requested user authentication information to the MME.

Note that in the arrangement shown in FIG. 7, the signalling flows between UDM and UDR in operations 6-7 and 11-12 are optional. For example, the UDR may be unnecessary if the UDM can store data locally.

Figure 8:
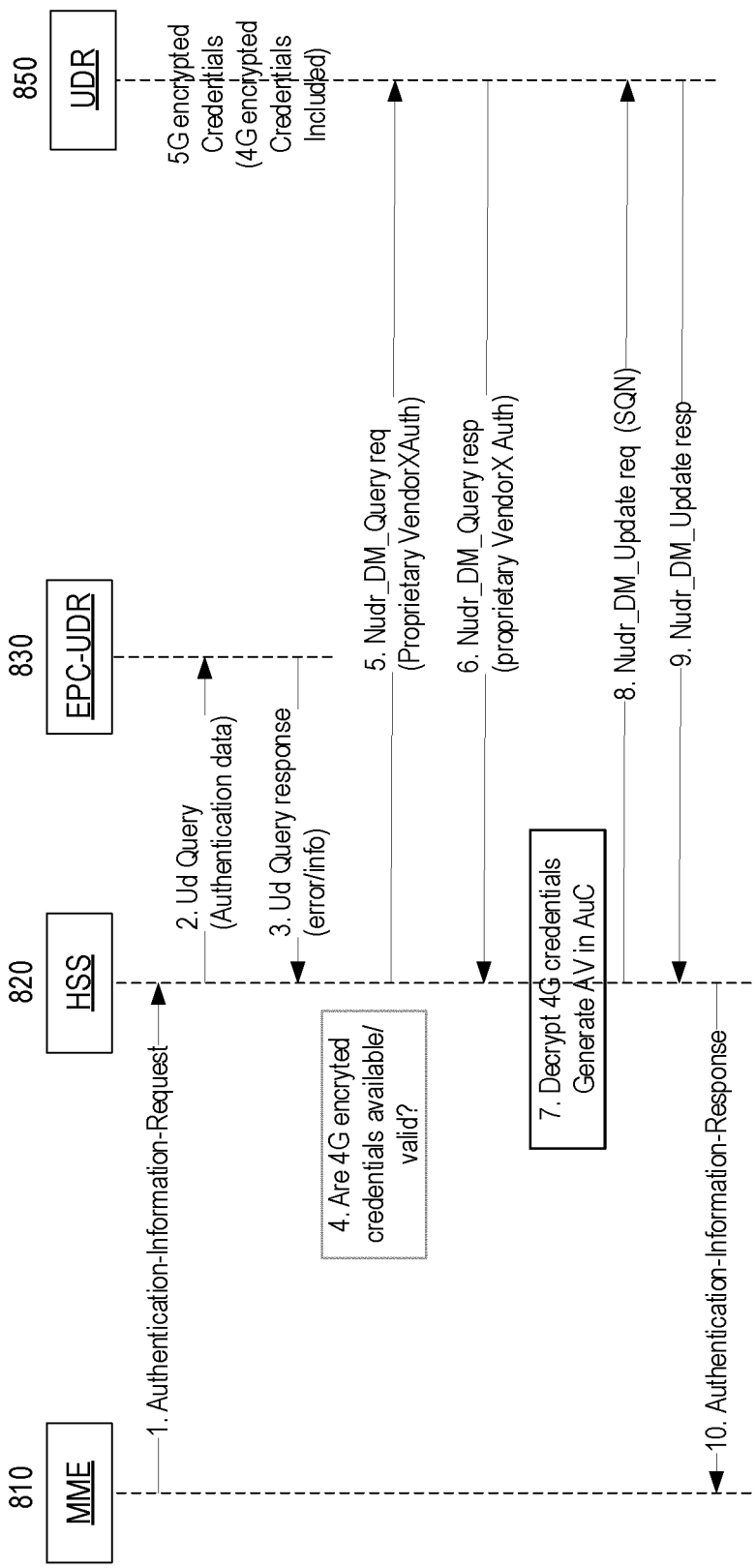

In other embodiments, the HSS can interact directly with the UDR, simplifying the signalling flow shown in FIG. 7. FIG. 8 shows an exemplary signalling diagram among various core network entities, according to these exemplary embodiments. In such case, the HSS can communicate directly with the UDR without the UDM as an intermediary.

The embodiments described above relate to an existing 4G user that is 5G-enabled. In other embodiments, a new user could be directly provisioned as a 5G user but also include a 4G profile. As such, this user could access 4G networks, but the user's 4G profile does not exist in the EPC-UDR. Even so, the signalling flow shown in FIG. 8 can be used for this scenario, provided that both 4G and 5G encrypted credentials are provisioned in UDR.

Figure 9:
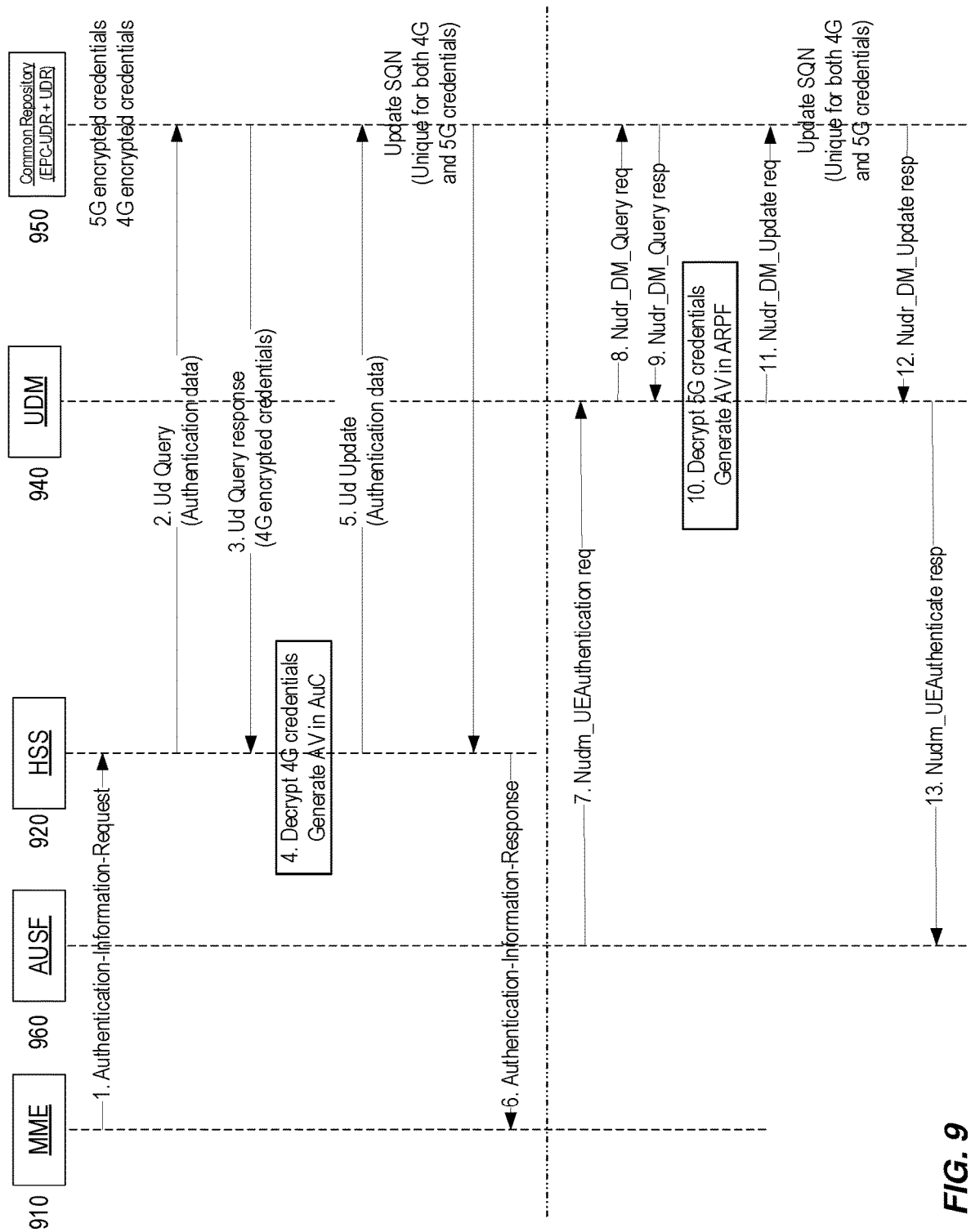

The embodiments described above relate to scenarios in which there are two independent repositories: EPC-UDR and UDR. This will be normally the case when a Vendor1 HSS/EPC-UDR is deployed but the operator selects a Vendor2 UDR for deployment. However, it can be desirable to deploy a Vendor1 UDR together with a deployed Vendor1 HSS/EPC-UDR. In this single-vendor case, it is possible to provide a Common Repository for consolidated 4G/5G subscriber information that is accessible by both Ud and Nudr. FIG. 9 shows an exemplary signalling diagram among various core network entities in relation to subsequent 4G network access for a 5G-enabled user, according to exemplary embodiments of the present disclosure that utilize a Common Repository for consolidated 4G/5G subscriber information. Although the various operations in FIG. 9 are labelled with numbers, these numbers are merely for facilitating explanation and neither require nor suggest the operations to be performed in a particular order, unless specifically stated in the following explanation. Furthermore, the operations shown can be combined and/or divided into operations having different functionality than shown in FIG. 9. In addition, the exemplary method and/or procedure shown in FIG. 9 can be complementary to other exemplary methods and/or procedures disclosed herein, such that they are capable of being used cooperatively to provide the benefits, advantages, and/or solutions to problems described hereinabove.

Operations 1-6 show an exemplary authentication flow for a user accessing a 4G network. Operations 7-13 show an exemplary authentication flow for the user accessing a 5G network. In this scenario, the Common Repository includes both EPC-UDR and (5GC) UDR, with both 4G and 5G encrypted credentials being stored in the Common Repository. As discussed above, the SQN of the encryption parameters must be unique in order to avoid synchronization problems between 4G and 5G accesses.

As briefly mentioned, embodiments described above can be based on existing, updated, and/or newly-created services associated with 3GPP service-based architecture (SBA) services. As such, the various embodiments can be implemented efficiently in a cloud-based network architecture.

Figure 10:
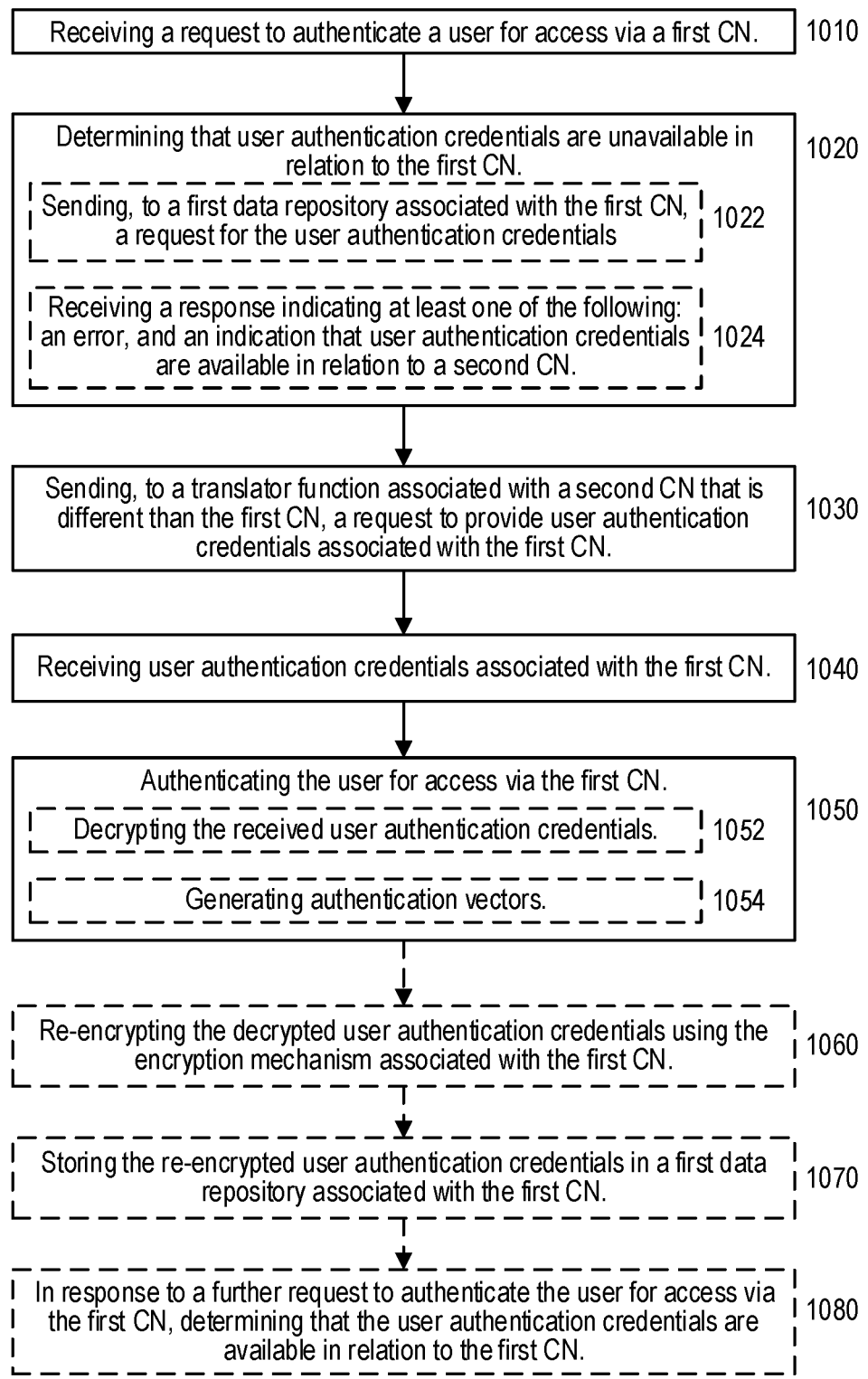
FIGS. 10-12 illustrate exemplary methods and/or procedures for managing user authentication credentials in relation to different types of core networks, according to various exemplary embodiments of the present disclosure.

FIG. 10 illustrates an exemplary method and/or procedure for managing user authentication credentials in relation to different types of core networks (CNs), according to various exemplary embodiments of the present disclosure. The exemplary method and/or procedure shown in FIG. 10 can be performed by a data management node (e.g., UDM) in a first CN (e.g., 5GC), such as shown in and/or described in relation to other figures herein. Although the exemplary method and/or procedure is illustrated in FIG. 10 by blocks in a particular order, this order is exemplary and the operations corresponding to the blocks can be performed in different orders, and can be combined and/or divided into blocks and/or operations having different functionality than shown in FIG. 10. Furthermore, the exemplary method and/or procedure shown in FIG. 10 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 10 can be used with one or more of the exemplary methods and/or procedures shown in FIG. 11. Optional blocks and/or operations are indicated by dashed lines.

The exemplary method and/or procedure can include the operations of block 1010, where the node can receive a request to authenticate a user for access via a first CN. The request can be received, for example, from an Authentication Support Function (AUSF) in a 5GC network. The exemplary method and/or procedure can also include the operations of block 1020, where the node can determine that user authentication credentials are unavailable in relation to the first CN.

In some embodiments, the determining operations in block 1020 can include the operations of sub-block 1022, where the node can send, to a first data repository associated with the first CN, a request for the user authentication credentials. For example, the first repository can be a unified data repository (UDR) in a 5GC network. In such embodiments, the determining operations in block 1020 can include the operations of sub-block 1024, where the node can receive, from the first data repository, a response indicating at least one of the following: an error; and an indication that user authentication credentials are available in relation to the second CN.

The exemplary method and/or procedure can also include the operations of block 1030, where the node can send, to a translator function associated with a second CN that is different than the first CN, a request to provide user authentication credentials associated with the first CN. The exemplary method and/or procedure can also include the operations of block 1040, where the node can receive user authentication credentials associated with the first CN, e.g., from the translator function. In some embodiments, the received user authentication credentials are encrypted using an encryption mechanism associated with the first CN.

The exemplary method and/or procedure can also include the operations of block 1050, where the node can, based on the received user authentication credentials, authenticate the user for access via the first CN. In embodiments where the received user authentication credentials are encrypted, the authentication operations of block 1050 can include the operations of sub-blocks 1052-1054, where the node can decrypt the received user authentication credentials and generate authentication vectors. In such embodiments, the node can then authenticate the user based on the generated authentication vectors.

In some embodiments, the exemplary method and/or procedure can also include the operations of block 1060, where the node can re-encrypt the decrypted user authentication credentials using the encryption mechanism associated with the first CN. In such embodiments, the exemplary method and/or procedure can also include the operations of block 1070, where the node can store the re-encrypted user authentication credentials in a first data repository associated with the first CN.

Furthermore, in some embodiments, the exemplary method and/or procedure can also include the operations of block 1080, where the node can, in response to receiving a further request to authenticate the user for access via the first CN, determine that the user authentication credentials are available in relation to the first CN. This determination can be based, for example, on the user credentials stored in the first data repository in an earlier operation (e.g., operations of block 1070).

Figure 11:
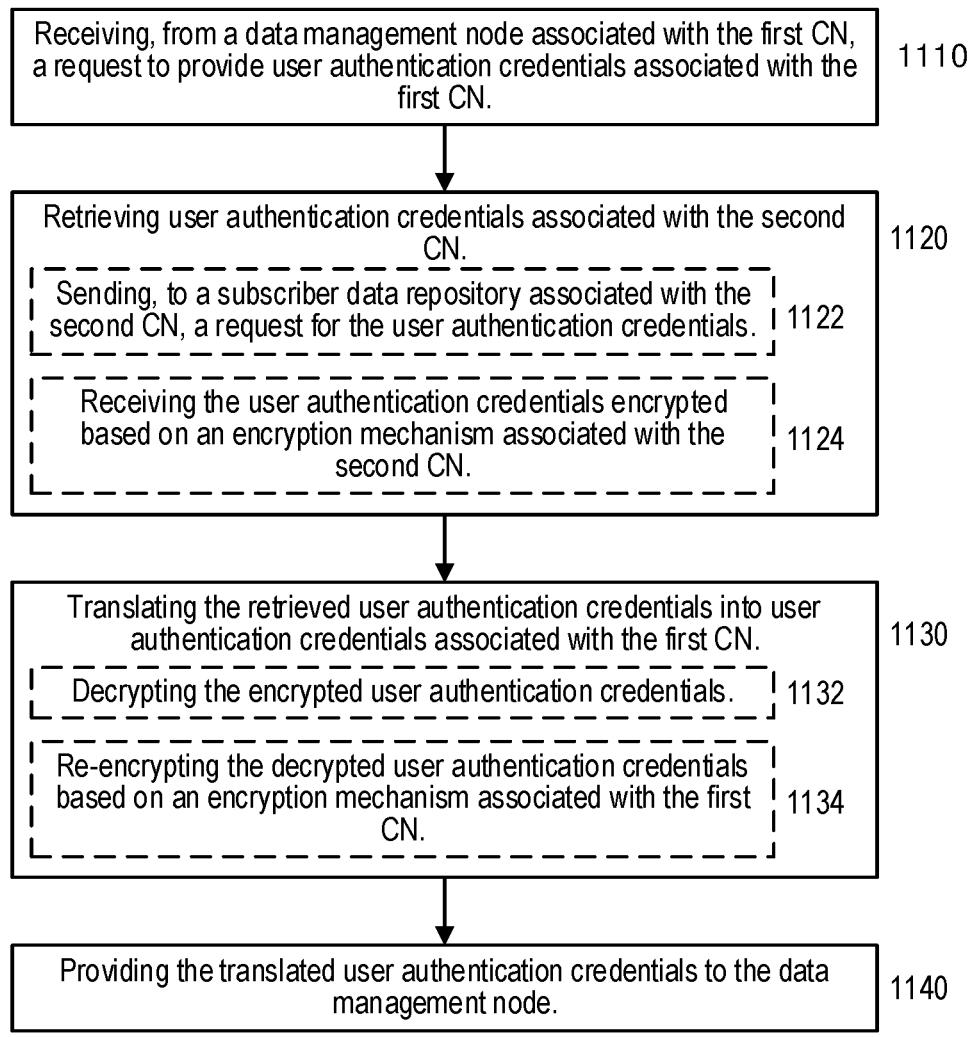

FIG. 11 illustrates an exemplary method and/or procedure for providing user authentication credentials for a second core network, CN, that is different from a first CN, that is, for managing user authentication credentials in relation to different types of core networks, CNs, according to various exemplary embodiments of the present disclosure. The exemplary method and/or procedure shown in FIG. 11 can be performed by an encrypted credentials translator function, node, and/or service (e.g., a 4G-5G encrypted credentials translator) associated with the second CN (e.g., 4G EPC), such as shown in and/or described in relation to other figures herein. Although the exemplary method and/or procedure is illustrated in FIG. 11 by blocks in a particular order, this order is exemplary and the operations corresponding to the blocks can be performed in different orders, and can be combined and/or divided into blocks having different functionality than shown in FIG. 11. Furthermore, the exemplary method and/or procedure shown in FIG. 11 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 11 can be used with one or more of the exemplary methods and/or procedures shown in FIG. 10. Optional blocks and/or operations are indicated by dashed lines.

The exemplary method and/or procedure can include the operations of block 1110, where the translator node can receive, from a data management node associated with the first CN, a request to provide user authentication credentials associated with the first CN. For example, the data management node can be a user data management (UDM) function and/or node in a 5GC network. The exemplary method and/or procedure can also include the operations of block 1120, where the translator node can retrieve user authentication credentials associated with the second CN.

In some embodiments, the retrieving operations of block 1120 can include the operations of sub-block 1122, where the translator node can send, to a subscriber data repository associated with the second CN, a request for the user authentication credentials. In such embodiments, the retrieving operations of block 1120 can also include the operations of sub-block 1124, where the translator node can receive, from the subscriber data repository, the user authentication credentials encrypted based on an encryption mechanism associated with the second CN.

The exemplary method and/or procedure can also include the operations of block 1130, where the translator node can translate the retrieved user authentication credentials into user authentication credentials associated with the first CN. In some embodiments, the translating operations of block 1130 can include the operations of sub-block 1132, where the translator node can decrypt the encrypted user authentication credentials, and sub-block 1134, where the translator node can re-encrypt the decrypted user authentication credentials based on an encryption mechanism associated with the first CN.

The exemplary method and/or procedure can also include the operations of block 1140, where the translator node can provide the translated user authentication credentials to the data management node. In some embodiments, the translated user authentication credentials provided to the data management node can include the re-encrypted user authentication credentials and at least one of the following: an indication of the particular encryption mechanism used for the re-encryption; and information needed to decrypt the re-encrypted user authentication credentials.

Figure 12:
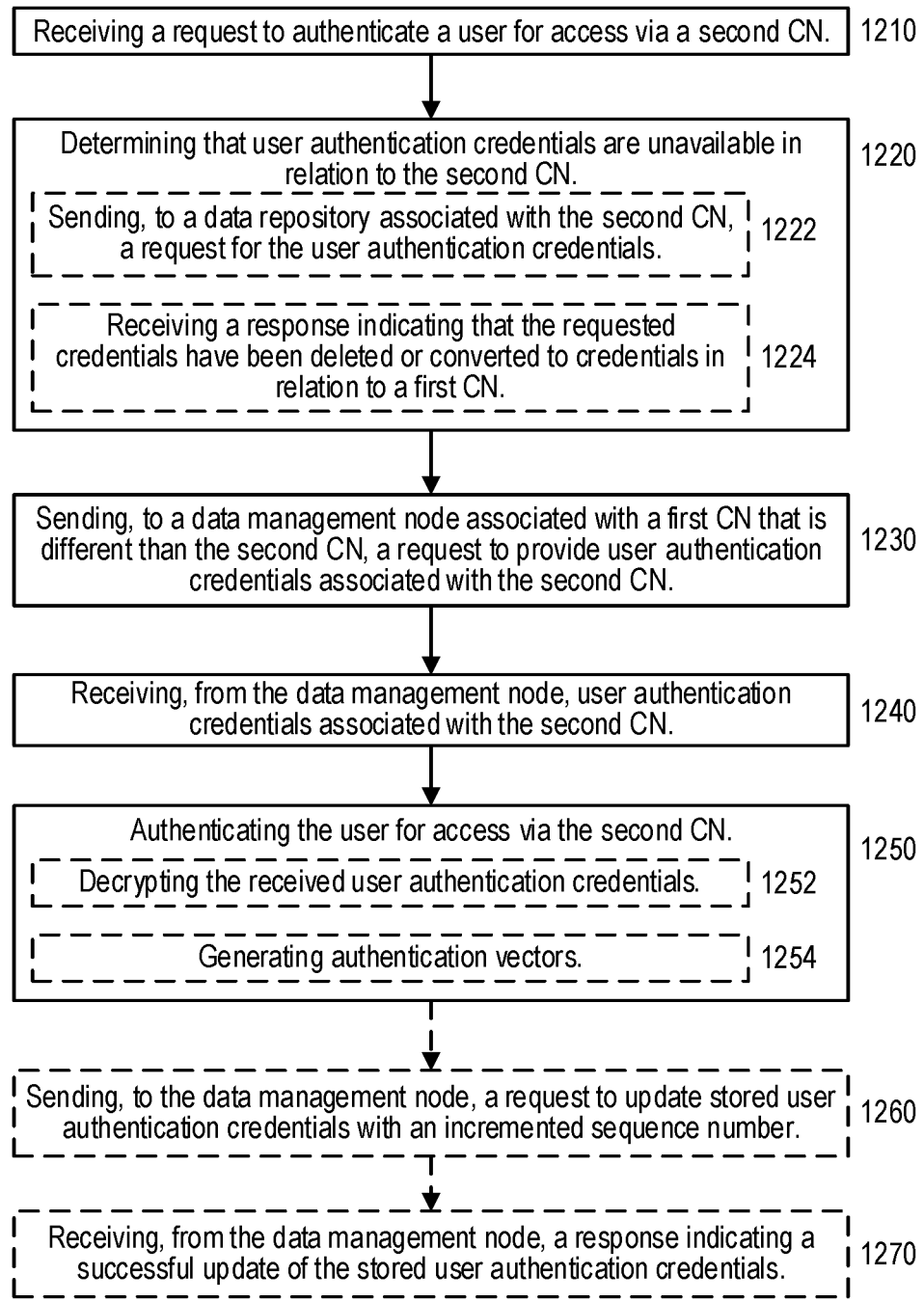

FIG. 12 illustrates an exemplary method and/or procedure for managing user authentication credentials in relation to different types of core networks (CNs), according to various exemplary embodiments of the present disclosure. The exemplary method and/or procedure shown in FIG. 12 can be performed by an data management node or subscriber server (e.g., a Home Subscriber Server, HSS) associated with the second CN (e.g., 4G EPC), such as shown in and/or described in relation to other figures herein. Although the exemplary method and/or procedure is illustrated in FIG. 12 by blocks in a particular order, this order is exemplary and the operations corresponding to the blocks can be performed in different orders, and can be combined and/or divided into blocks having different functionality than shown in FIG. 12. Furthermore, the exemplary method and/or procedure shown in FIG. 12 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 12 can be used with one or more of the exemplary methods and/or procedures shown in FIGS. 10-11. Optional blocks and/or operations are indicated by dashed lines.

The exemplary method and/or procedure can include the operations of block 1210, where the node can receive a request to authenticate a user for access via a second CN. For example, the node can receive the request from a mobility management entity (MIME) in a 4G EPC. The exemplary method and/or procedure can also include the operations of block 1220, where the node can determine that user authentication credentials are unavailable in relation to the second CN. In some embodiments, this determining operation can include sending a request for the credentials to a data repository associated with the second CN (e.g., an EPC-UDR), and receiving an indication, in response, that the credentials have been deleted or converted to credentials in relation to a first CN (e.g., 5GC) that is different than the second CN.

The exemplary method and/or procedure can also include the operations of block 1230, where the node can send, to a data management node associated with the first CN that is different than the second CN, a request to provide user authentication credentials associated with the second CN. The exemplary method and/or procedure can also include the operations of block 1240, where the node can receive, from the data management node, user authentication credentials associated with the second CN. The exemplary method and/or procedure can also include the operations of block 1250, where the node can, based on the received user authentication credentials, authenticate the user for access via the second CN.

In some embodiments, the received (e.g., in block 1240) user authentication credentials can be encrypted using an encryption mechanism associated with the second CN. In such embodiments, the authentication operations in block 1250 can also include the operations of sub-blocks 1252 and 1254, where the node can decrypt the received user authentication credentials and generate authentication vectors. In such case, the node can authenticate the user based on the generated authentication vectors.

In some embodiments, the decryption operation in sub-block 1252 can include incrementing an encryption sequence number (e.g., SQN). In such embodiments, the exemplary method and/or procedure can also include the operations of block 1260, where the node can send, to the data management node, a request to update stored user authentication credentials with the incremented sequence number. In such embodiments, the exemplary method and/or procedure can also include the operations of block 1270, where the node can receive, from the data management node, a response indicating a successful update of the stored user authentication credentials.

Figure 13:
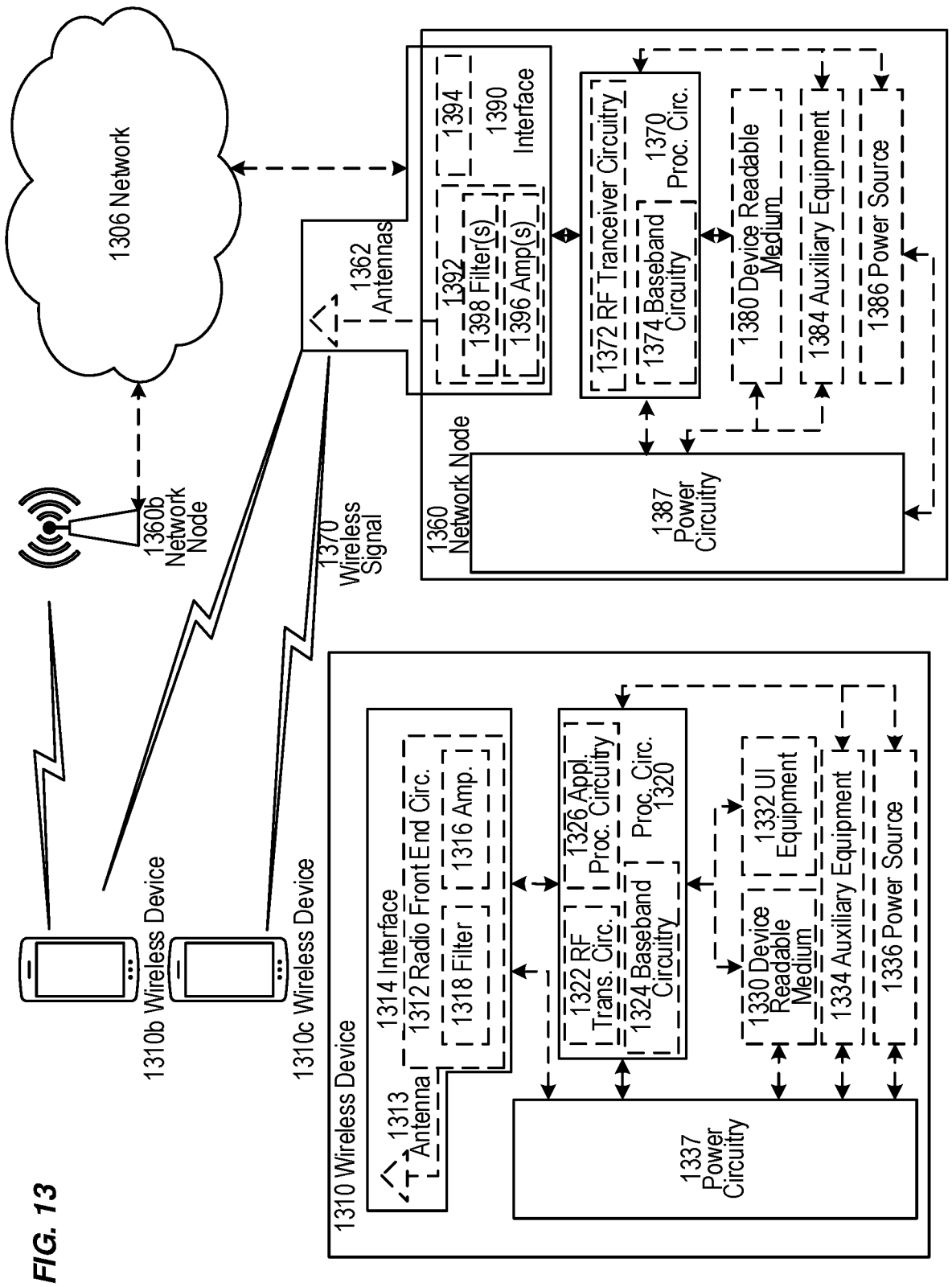
FIG. 13 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360*b*, and WDs 1310, 1310*b*, and 1310*c*. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and a RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 can execute instructions stored in device readable medium 1380 or in memory within processing circuitry 1370. Such functionality can include providing any of the various wireless features, functions, or benefits discussed herein. In some embodiments, processing circuitry 1370 can include a system on a chip (SOC).

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality can include providing any of the various wireless features or benefits discussed herein. For example, processing circuitry 1320 can execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310, and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network, and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
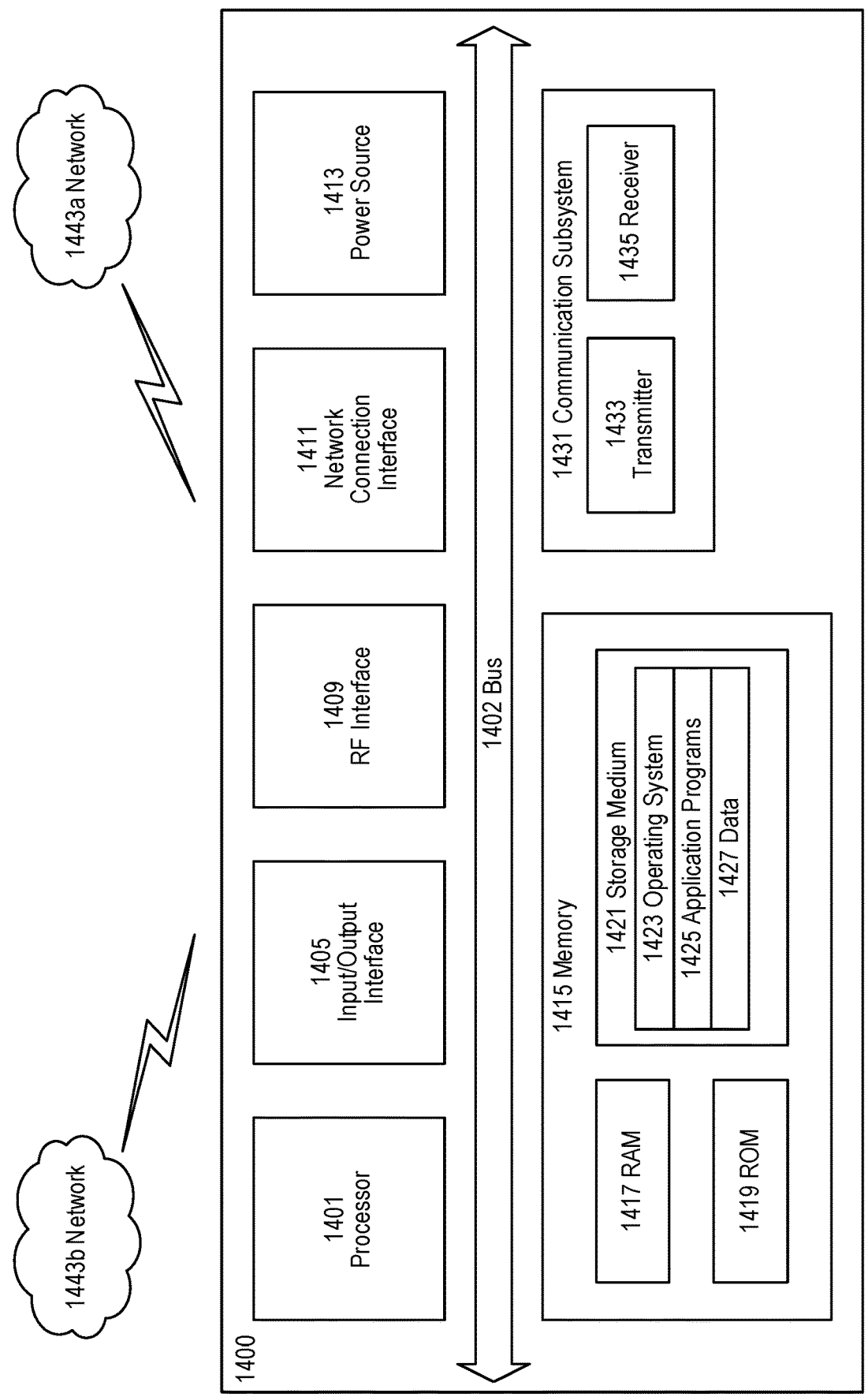
FIG. 14 illustrates an exemplary embodiment of a UE, in accordance with various aspects described herein.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 14200 can be any UE identified by the 3$^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443a. Network 1443a can encompass wired and/or wireless networks such as a local-area network (LAN), a wide-area network (WAN), a computer network, a wireless network, a telecommunications network, another like network or any combination thereof. For example, network 1443a can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 can be configured to include operating system 1423, application program 1425 such as a web browser application, a widget or gadget engine or another application, and data file 1427. Storage medium 1421 can store, for use by UE 1400, any of a variety of various operating systems or combinations of operating systems.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443b using communication subsystem 1431. Network 1443a and network 1443b can be the same network or networks or different network or networks. Communication subsystem 1431 can be configured to include one or more transceivers used to communicate with network 1443b. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443b can encompass wired and/or wireless networks such as a local-area network (LAN), a wide-area network (WAN), a computer network, a wireless network, a telecommunications network, another like network or any combination thereof. For example, network 1443b can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
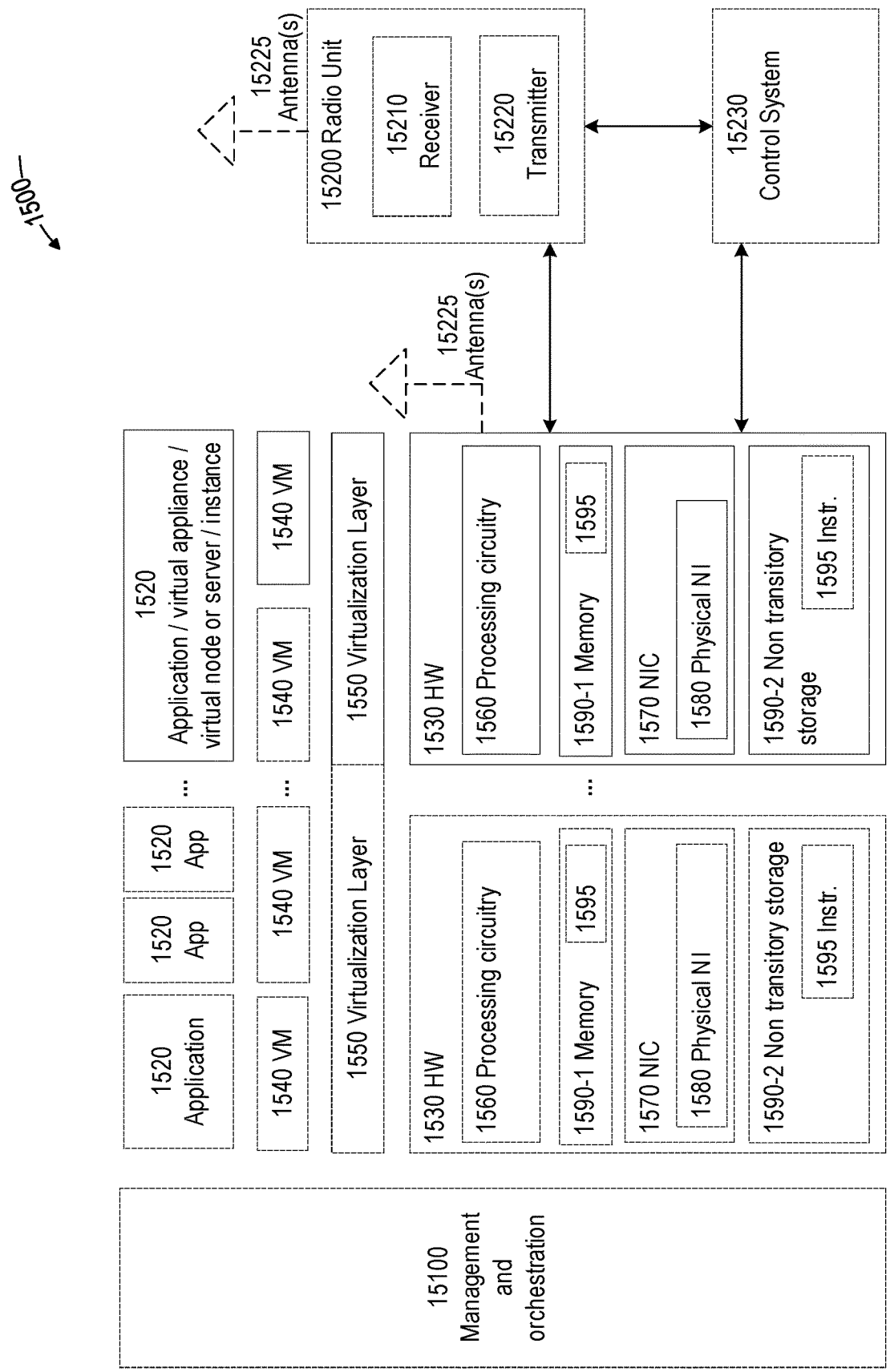
FIG. 15 is a block diagram illustrating an exemplary virtualization environment usable for implementation of various embodiments of network nodes described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station.

In some embodiments, some signalling can be effected with the use of control system 15230 which can alternatively be used for communication between the hardware nodes 1530 and radio units 15200.

Figure 16:
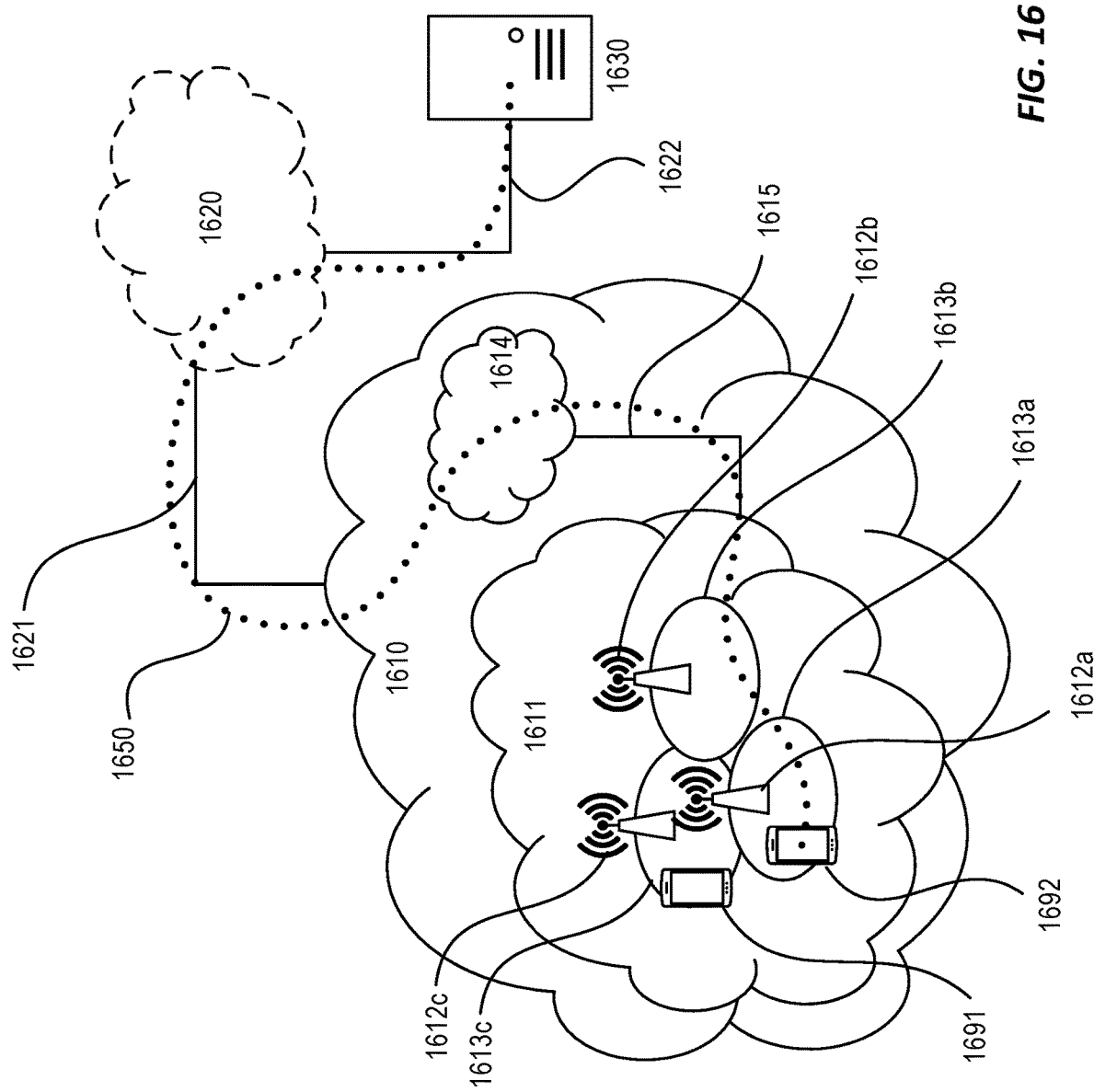
FIGS. 16-17 are block diagrams of various exemplary communication systems and/or networks, in accordance with various aspects described herein.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c can be configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider, or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 can also include UE 1730 already referred to. Its hardware 1735 can include radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data. Client application 1732 can interact with the user to generate the user data that it provides.

Figure 17:
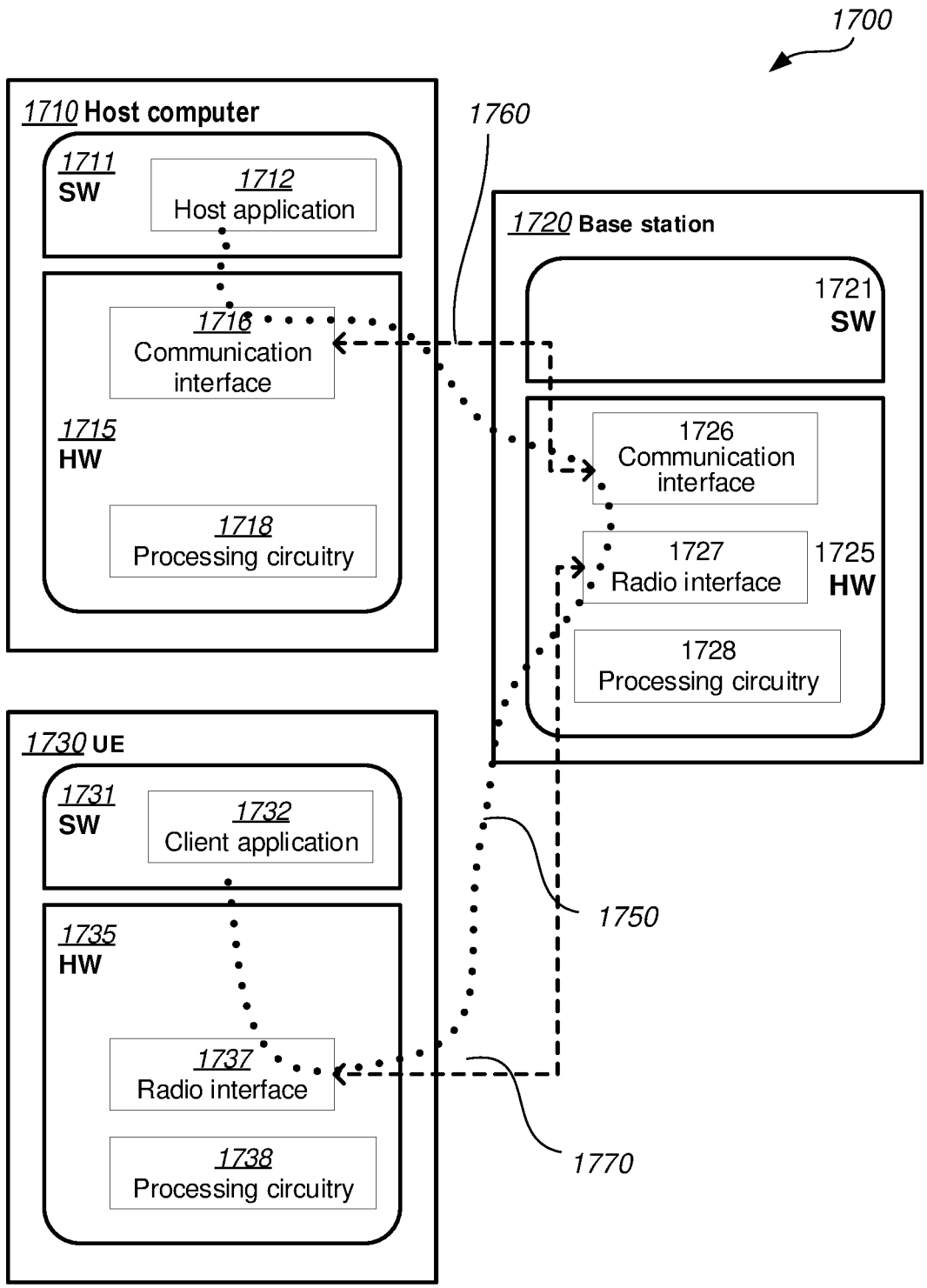

It is noted that host computer 1710, base station 1720 and UE 1730 illustrated in FIG. 17 can be similar or identical to host computer 1630, one of base stations 1612*a*, 1612*b*, 1612*c* and one of UEs 1691, 1692 of FIG. 16, respectively. This is to say, the inner workings of these entities can be as shown in FIG. 17 and independently, the surrounding network topology can be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to FIGS. 16 and 17. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to FIGS. 16 and 17. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to FIGS. 16 and 17. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Exemplary embodiments include the following numbered embodiments.

1. A method for managing user authentication credentials in relation to different types of core networks, CNs, the method comprising:
   receiving (1010) a request to authenticate a user for access via a first CN;
   determining (1020) that user authentication credentials are unavailable in relation to the first CN;
   sending (1030), to a translator function associated with a second CN that is different than the first CN, a request to provide user authentication credentials associated with the first CN;
   receiving (1040) user authentication credentials associated with the first CN; and
   based on the received user authentication credentials, authenticating (1050) the user for access via the first CN.

2. The method of embodiment 1, wherein determining (1020) that user authentication credentials are unavailable in relation to the first CN comprises:
   sending (1022), to a first data repository associated with the first CN, a request for the user authentication credentials; and
   receiving (1024), from the first data repository, a response indicating at least one of the following: an error, and an indication that user authentication credentials are available in relation to the second CN.

3. The method of any of embodiments 1-2, wherein:
   the received user authentication credentials are encrypted using an encryption mechanism associated with the first CN; and
   authenticating (1050) the user for access via the first CN comprises:
      decrypting (1052) the received user authentication credentials;
      generating (1054) authentication vectors; and
      authenticating the user based on the generated authentication vectors.

4. The method of embodiment 3, further comprising:
   re-encrypting (1060) the decrypted user authentication credentials using the encryption mechanism associated with the first CN; and
   storing (1070) the re-encrypted user authentication credentials in a first data repository associated with the first CN.

5. The method of any of embodiments 1-4, further comprising, in response to a further request to authenticate the user for access via the first CN, determining (1080) that the user authentication credentials are available in relation to the first CN.

6. The method of any of embodiments 1-5, wherein:
   the first CN is a 5G CN and the second CN is a 4G CN;
   the method is performed by a user data management, UDM, node of the 5G CN; and
   the translator function is a 4G-5G encrypted credentials translator.

7. A method for providing user authentication credentials for a second core network, CN, that is different from a first CN, the method comprising:
   receiving (1110), from a data management node associated with the first CN, a request to provide user authentication credentials associated with the first CN;
   retrieving (1120) user authentication credentials associated with the second CN;
   translating (1130) the retrieved user authentication credentials into user authentication credentials associated with the first CN; and
   providing (1040) the translated user authentication credentials to the data management node.

8. The method of embodiment 7, wherein retrieving (1120) user authentication credentials associated with the second CN comprises:
   sending (1122), to a subscriber data repository associated with the second CN, a request for the user authentication credentials; and
   receiving (1124), from the subscriber data repository, the user authentication credentials encrypted based on an encryption mechanism associated with the second CN.

9. The method of embodiment 8, wherein translating (1130) the retrieved user authentication credentials comprises:
   decrypting (1132) the encrypted user authentication credentials; and
   re-encrypting (1134) the decrypted user authentication credentials based on an encryption mechanism associated with the first CN.

10. The method of embodiment 9, wherein the translated user authentication credentials provided to the data management node includes the re-encrypted user authentication credentials and at least one of the following:
   an indication of the particular encryption mechanism used for the re-encryption; and
   information needed to decrypt the re-encrypted user authentication credentials.

11. The method of any of embodiments 7-10, wherein:
   the first CN is a 5G CN and the second CN is a 4G CN;
   the method is performed by a 4G-5G encrypted credentials translator.

12. A method for managing user authentication credentials in relation to different types of core networks, CNs, the method comprising:
   receiving (1210) a request to authenticate a user for access via a second CN;
   determining (1220) that user authentication credentials are unavailable in relation to the second CN;
   sending (1230), to a data management node associated with a first CN that is different than the second CN, a request to provide user authentication credentials associated with the second CN;
   receiving (1240), from the data management node, user authentication credentials associated with the second CN; and
   based on the received user authentication credentials, authenticating (1250) the user for access via the second CN.

13. The method of embodiment 12, wherein:
   the received user authentication credentials are encrypted using an encryption mechanism associated with the second CN; and
   authenticating (1250) the user for access via the second CN comprises:
      decrypting (1252) the received user authentication credentials;
      generating (1254) authentication vectors; and
      authenticating the user based on the generated authentication vectors.

14. The method of embodiment 13, wherein:
   decrypting (1252) the received user authentication credentials comprises incrementing an encryption sequence number; and
   the method further comprises:
      sending (1260), to the data management node, a request to update stored user authentication credentials with the incremented sequence number; and
      receiving (1270), from the data management node, a response indicating a successful update of the stored user authentication credentials.

15. The method of any of embodiments 12-14, wherein:
   the first CN is a 5G CN and the second CN is a 4G CN; and
   the method is performed by a home subscriber server, HSS, of the 4G CN.

16. A first core network, CN, comprising:
   a first access management node (610);
   a first data management node (630, 740, 940) coupled to a first subscriber data repository (640, 750, 850, 950); and
   an encrypted credentials translator function (620) configured to communicate with the first access management node and a second subscriber data repository (650, 730, 830, 950) associated with a second CN,
   wherein the first data management node is configured to perform operations corresponding to any of the methods of embodiments 1-6.

17. The first core network of embodiment 16, wherein the encrypted credentials translator function (620) is configured to perform operations corresponding to any of the methods of embodiments 7-11.

18. The first core network of any of embodiments 16-17, wherein:
   the first CN is a 5G CN and the second CN is a 4G CN;
   the first access management node (610) comprises at least one of a Authentication Server Function (AUSF) and an Access and Mobility Management Function (AMF);
   the first data management node (630, 740, 940) comprises a user data management (UDM) function; and
   the first data subscriber data repository comprises a Unified Data Repository (UDR).

19. The first core network of any of embodiments 16-18, wherein the first and second subscriber data repositories are part of a unified data repository (950).

20. A data management node (630, 740, 940) in a first core network, CN, the data management node comprising:
   a network interface configured to communicate with a first subscriber data repository (640, 750, 850, 950) and an encrypted credentials translator function (620);
   processing circuitry operably coupled to the network interface and configured to perform operations corresponding to any of the methods of embodiments 1-6; and
   power supply circuitry configured to supply power to the first data management node.

21. A data management node (630, 740, 940) in a first core network, CN, the data management node being arranged to perform operations corresponding to any of the methods of embodiments 1-6.

22. A non-transitory, computer-readable medium storing computer-executable instructions that, when executed by processing circuitry comprising a data management node in a core network, configure the node to perform operations corresponding to any of the methods of embodiments 1-6.

23. A computer program product comprising computer-executable instructions that, when executed by processing circuitry comprising a data management node in a core network, configure the node to perform operations corresponding to any of the methods of embodiments 1-6.

24. An encrypted credentials translator node (620) associated with a second core network, CN, the encrypted credentials translator function comprising:
   a network interface configured to communicate with:
      a second subscriber data repository (650, 730, 830, 950) associated with the second CN; and
      either a first data management node (630, 740, 940) or a first subscriber data repository (650, 730, 830, 950) associated with a first CN that is different than the second CN;
   processing circuitry operably coupled to the network interface and configured to perform operations corresponding to any of the methods of embodiments 7-10; and power supply circuitry configured to the encrypted credentials translator function.

25. An encrypted credentials translator node (620) associated with a second core network, the encrypted credentials translator node being arranged to perform operations corresponding to any of the methods of embodiments 7-10.

26. A non-transitory, computer-readable medium storing computer-executable instructions that, when executed by processing circuitry comprising an encrypted credentials translator node in a core network, configure the node to perform operations corresponding to any of the methods of embodiments 7-10.

27. A computer program product comprising computer-executable instructions that, when executed by processing circuitry comprising an encrypted credentials translator node in a core network, configure the node to perform operations corresponding to any of the methods of embodiments 7-10.

28. A data management node (720, 820, 920) in a second core network, CN, the data management node comprising:
  a network interface configured to communicate with:
    a second subscriber data repository (650, 730, 830, 950) associated with the second CN; and
    either a first data management node (630, 740, 940) or a first subscriber data repository (650, 730, 830, 950) associated with a first CN that is different than the second CN;
  processing circuitry operably coupled to the network interface and configured to perform operations corresponding to any of the methods of embodiments 11-15; and
  power supply circuitry configured to supply power to the first data management node.

29. A data management node (720, 820, 920) in a second core network, CN, the data management node being arranged to perform operations corresponding to any of the methods of embodiments 11-15.

30. A non-transitory, computer-readable medium storing computer-executable instructions that, when executed by processing circuitry comprising a data management node in a core network, configure the node to perform operations corresponding to any of the methods of embodiments 11-15.

31. A computer program product comprising computer-executable instructions that, when executed by processing circuitry comprising a data management node in a core network, configure the node to perform operations corresponding to any of the methods of embodiments 11-15.

The invention claimed is:

1. A method for managing user authentication credentials in relation to different types of core networks, CNs, the method performed by a data management node associated with a first CN and comprising:
  receiving a request to authenticate a user for access via the first CN;
  determining that user authentication credentials are unavailable in relation to the first CN;
  sending, to a translator function associated with a second CN that is different than the first CN, a request to provide user authentication credentials associated with the first CN;
  receiving user authentication credentials associated with the first CN; and
  based on the received user authentication credentials, authenticating the user for access via the first CN, wherein authenticating the user for access via the first CN comprises:
    decrypting the received user authentication credentials;
    generating authentication vectors; and
    authenticating the user based on the generated authentication vectors.

2. The method of claim 1, wherein determining that user authentication credentials are unavailable in relation to the first CN comprises:
  sending, to a first data repository associated with the first CN, a request for the user authentication credentials; and
  receiving, from the first data repository, a response indicating at least one of the following: an error, and an indication that user authentication credentials are available in relation to the second CN.

3. The method of claim 1, wherein:
  the received user authentication credentials are encrypted using an encryption mechanism associated with the first CN.

4. The method of claim 3, further comprising:
  re-encrypting the decrypted user authentication credentials using the encryption mechanism associated with the first CN; and
  storing the re-encrypted user authentication credentials in a first data repository associated with the first CN.

5. The method of claim 1, further comprising, in response to a further request to authenticate the user for access via the first CN, determining (1080) that the user authentication credentials are available in relation to the first CN.

6. The method of claim 1, wherein:
  the first CN is a 5G CN and the second CN is a 4G CN;
  the data management node is a user data management, UDM, node of the 5G CN; and
  the translator function is a 4G-5G encrypted credentials translator.

7. A method for managing user authentication credentials in relation to different types of core networks, CNs, the method performed by a translator function associated with a second CN and comprising:
  receiving, from a data management node associated with a first CN that is different from the second CN, a request to provide user authentication credentials associated with the first CN;
  retrieving user authentication credentials associated with the second CN;
  translating the retrieved user authentication credentials into user authentication credentials associated with the first CN; and
  providing the translated user authentication credentials to the data management nod, such that the user is authenticated for access via the second CN in response to:
    decrypting the translated user authentication credentials;
    generating authentication vectors; and
    authenticating the user based on the generated authentication vectors.

8. The method of claim 7, wherein retrieving user authentication credentials associated with the second CN comprises:
  sending, to a subscriber data repository associated with the second CN, a request for the user authentication credentials; and
  receiving, from the subscriber data repository, the user authentication credentials encrypted based on an encryption mechanism associated with the second CN.

9. The method of claim 8, wherein translating the retrieved user authentication credentials comprises:
  decrypting the encrypted user authentication credentials; and re-encrypting the decrypted user authentication credentials based on an encryption mechanism associated with the first CN.

10. The method of claim 9, wherein the translated user authentication credentials provided to the data management node includes the re-encrypted user authentication credentials and at least one of the following:
an indication of the particular encryption mechanism used for the re-encryption; and
information needed to decrypt the re-encrypted user authentication credentials.

11. The method of claim 7, wherein:
the first CN is a 5G CN and the second CN is a 4G CN;
the data management node is a user data management, UDM, node of the 5G CN; and
the translator function is a 4G-5G encrypted credentials translator.

12. A method for managing user authentication credentials in relation to different types of core networks, CNs, the method performed by a subscriber server associated with a second CN and comprising:
receiving a request to authenticate a user for access via the second CN;
determining that user authentication credentials are unavailable in relation to the second CN;
sending, to a data management node associated with a first CN that is different than the second CN, a request to provide user authentication credentials associated with the second CN;
receiving, from the data management node, user authentication credentials associated with the second CN, wherein authenticating the user for access via the second CN comprises:
decrypting the received user authentication credentials;
generating authentication vectors; and
authenticating the user based on the generated authentication vectors; and
based on the received user authentication credentials, authenticating the user for access via the second CN.

13. The method of claim 12, wherein:
the received user authentication credentials are encrypted using an encryption mechanism associated with the second CN.

14. The method of claim 13, wherein:
decrypting the received user authentication credentials comprises incrementing an encryption sequence number; and
the method further comprises:
sending, to the data management node, a request to update stored user authentication credentials with the incremented sequence number; and
receiving, from the data management node, a response indicating a successful update of the stored user authentication credentials.

15. The method of claim 12, wherein:
the first CN is a 5G CN and the second CN is a 4G CN;
the data management node is a user data management, UDM, node of the 5G CN; and
the subscriber server is a home subscriber server, HSS, of the 4G CN.

16. A first data management node in a first core network, CN, the first data management node being arranged to:
receive a request to authenticate a user for access via the first CN;
determine that user authentication credentials are unavailable in relation to the first CN;
send, to a translator function associated with a second CN that is different than the first CN, a request to provide user authentication credentials associated with the first CN;
receive user authentication credentials associated with the first CN; and
based on the received user authentication credentials, authenticate the user for access via the first CN, wherein the first data management node arranged to authenticate the user for access via the first CN is further configured to:
decrypt the received user authentication credentials;
generate authentication vectors; and
authenticate the user based on the generated authentication vectors.

17. An encrypted credentials translator node associated with a second core network, the encrypted credentials translator node being arranged to:
receive, from a data management node associated with a first CN that is different from the second CN, a request to provide user authentication credentials associated with the first CN;
retrieve user authentication credentials associated with the second CN;
translate the retrieved user authentication credentials into user authentication credentials associated with the first CN; and
provide the translated user authentication credentials to the data management node, such that the user is authenticated for access in response to:
decrypting the translated user authentication credentials;
generating authentication vectors; and
authenticating the user based on the generated authentication vectors.

* * * * *